(12) United States Patent
Koizumi et al.

(10) Patent No.: US 11,467,570 B2
(45) Date of Patent: Oct. 11, 2022

(54) ANOMALOUS SOUND DETECTION APPARATUS, ANOMALY MODEL LEARNING APPARATUS, ANOMALY DETECTION APPARATUS, ANOMALOUS SOUND DETECTION METHOD, ANOMALOUS SOUND GENERATION APPARATUS, ANOMALOUS DATA GENERATION APPARATUS, ANOMALOUS SOUND GENERATION METHOD AND PROGRAM

(71) Applicant: NIPPON TELEGRAPH AND TELEPHONE CORPORATION, Chiyoda-ku (JP)

(72) Inventors: Yuma Koizumi, Musashino (JP); Yuta Kawachi, Musashino (JP); Noboru Harada, Musashino (JP); Shoichiro Saito, Musashino (JP); Akira Nakagawa, Musashino (JP); Shin Murata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 114 days.

(21) Appl. No.: 16/643,916

(22) PCT Filed: Aug. 24, 2018

(86) PCT No.: PCT/JP2018/031345
§ 371 (c)(1),
(2) Date: Mar. 3, 2020

(87) PCT Pub. No.: WO2019/049688
PCT Pub. Date: Mar. 14, 2019

(65) Prior Publication Data
US 2020/0209842 A1 Jul. 2, 2020

(30) Foreign Application Priority Data
Sep. 6, 2017 (JP) .............................. JP2017-17105 8
Jan. 15, 2018 (JP) .............................. JP2018-003979

(51) Int. Cl.
*G05B 23/02* (2006.01)
*G06N 20/00* (2019.01)

(52) U.S. Cl.
CPC ..... *G05B 23/0254* (2013.01); *G05B 23/0283* (2013.01); *G06N 20/00* (2019.01)

(58) Field of Classification Search
CPC ............ G05B 23/0254; G05B 23/0283; G05B 2219/37337; G05B 23/0221;
(Continued)

(56) References Cited

U.S. PATENT DOCUMENTS 2,284,412 A * 5/1942 Frentzel, Jr. .......... E02F 3/6481
37/425
6,272,463 B1 * 8/2001 Lapere .................. G10L 15/065
704/E15.013

(Continued)

FOREIGN PATENT DOCUMENTS

JP 9-72596 A 3/1997
JP 2010-92266 A 4/2010

(Continued)

OTHER PUBLICATIONS

Martin Grill: "Combining network anomaly detectors", Retrieved from the Internet: URL: https//dspace.cvut.cz/bitstream/handle/10467/66683/Disertace_Grill_2016.pdf?sequence=1 [retrieved on Aug. 3, 2017], Aug. 1, 2016 (Aug. 1, 2016), XP055395697, pp. 1-109 with cover pages.

(Continued)

*Primary Examiner* — Mohammad K Islam
(74) *Attorney, Agent, or Firm* — Oblon, McClelland, Maier & Neustadt, L.L.P.

(57) ABSTRACT

Accuracy of unsupervised anomalous sound detection is improved using a small number of pieces of anomalous sound data. A threshold deciding part (13) calculates an anomaly score for each of a plurality of pieces of anomalous sound data, using a normal model learned with normal sound data and an anomaly model expressing the pieces of anomalous sound data, and decides a minimum value among the (Continued)

anomaly scores as a threshold. A weight updating part (14) updates, using a plurality of pieces of normal sound data, the pieces of anomalous sound data and the threshold, weights of the anomaly model so that all the pieces of anomalous sound data are judged as anomalous, and probability of the pieces of normal sound data being judged as anomalous is minimized.

5 Claims, 11 Drawing Sheets

(58) Field of Classification Search
CPC ...... G05B 23/024; G06N 20/00; G06N 20/10; G06N 7/005; G01M 7/00
See application file for complete search history.

(56) References Cited

U.S. PATENT DOCUMENTS

| | | | |
|---|---|---|---|
| 7,310,590 | B1 | 12/2007 | Bansal |
| 2008/0059119 | A1 | 3/2008 | Hashimoto |
| 2008/0159549 | A1* | 7/2008 | Copley ............... H04R 5/02 381/58 |
| 2015/0052090 | A1* | 2/2015 | Lin .................... G06N 7/005 706/12 |
| 2015/0219530 | A1 | 8/2015 | Li et al. |
| 2016/0135706 | A1* | 5/2016 | Sullivan ............ A61B 5/7267 600/509 |
| 2016/0284349 | A1* | 9/2016 | Ravindran .......... G10L 15/285 |
| 2016/0300126 | A1 | 10/2016 | Callan et al. |
| 2017/0061322 | A1 | 3/2017 | Chari et al. |
| 2017/0180339 | A1* | 6/2017 | Cheng .................. G06F 21/31 |
| 2017/0263126 | A1* | 9/2017 | Kim ..................... G08G 1/163 |
| 2018/0101924 | A1* | 4/2018 | Yamaguchi .......... G06N 20/00 |
| 2018/0336465 | A1* | 11/2018 | Kim .................... G06N 3/0445 |
| 2021/0315511 | A1* | 10/2021 | Sharma ............... G06K 9/6257 |

FOREIGN PATENT DOCUMENTS

| | | |
|---|---|---|
| JP | 2012-181280 A | 9/2012 |
| JP | 2017-62713 A | 3/2017 |
| JP | 2017-102540 A | 6/2017 |

OTHER PUBLICATIONS

Stavros Ntalampiras, et al., "Probabilistic Novelty Detection for Acoustic Surveillance Under Real-World Conditions," IEEE Transactions on Multimedia, vol. 13, No. 4, Aug. 2011, pp. 713-719.
International Search Report and Written Opinion dated Oct. 16, 2018, in PCT/JP2018/031345, 4 pages.
Namba, M., "On the quality inspection of motors by detecting abnormal noise", FIT2007, Aug. 22, 2007, pp. 243-244 (with English translation).
Koizumi, Y. et al., "Anomaly Sound Detection for Machine Operating Sounds using Deep Neural Networks", CD-ROM, Mar. 17, 2017, pp. 473-476 (with English translation).
Ide, T. et al., "Anomaly Detection and Change Detection", 2015, pp. 6-7 (with partial English translation).
Bradley, A. P., "The Use of the Area Under the ROC Curve in the Evaluation of Machine Learning Algorithms", Pattern Recognition, vol. 30, No. 7, 1996, pp. 1145-1159.
Koizumi, Y. et al., "Optimizing Acoustic Feature Extractor for Anomalous Sound Detection Based on Neyman-Pearson Lemma", EUSIPCO, 2017, 5 pages.
Combined Chinese Office Action and Search Report dated Jun. 4, 2021 in Patent Application No. 201880057321.1 (with English language translation), 16 pages.
Aiguo Li, et al., "Data Mining Principles, Algorithms and Applications," Xidian University Press, 2012, 3 pages.

* cited by examiner

CASE WHERE ANOMALOUS SAMPLES ARE
GENERATED WITHOUT OPTIMIZING VARIANCE

THERE IS POSSIBILITY THAT ANOMALOUS SAMPLES MAY BE GENERATED
WITHIN NORMAL RANGE BECAUSE VARIANCE IS UNCONTROLLABLE

CASE WHERE ANOMALOUS SAMPLES ARE
GENERATED BY OPTIMIZING VARIANCE

ANOMALOUS SAMPLES ARE NOT GENERATED WITHIN
NORMAL RANGE BECAUSE VARIANCE IS CONTROLLED

ANOMALOUS SOUND DETECTION APPARATUS, ANOMALY MODEL LEARNING APPARATUS, ANOMALY DETECTION APPARATUS, ANOMALOUS SOUND DETECTION METHOD, ANOMALOUS SOUND GENERATION APPARATUS, ANOMALOUS DATA GENERATION APPARATUS, ANOMALOUS SOUND GENERATION METHOD AND PROGRAM

TECHNICAL FIELD

The present invention relates to an anomaly detection technique for judging whether a monitoring target is in a normal state or an anomalous state.

BACKGROUND ART

An apparatus for business use installed in a factory or the like, such as a large manufacturing machine or a molding machine, seriously hinders work only by its operation being stopped due to a malfunction. Therefore, it is necessary to daily monitor its operation state and take an immediate action when an anomaly occurs. As a solution, there is a method of a management agency of the apparatus for business use periodically dispatching maintenance personnel to a site to check abrasion of parts and the like. However, since significant labor costs and movement expenses are required, it is difficult to implement the method for all apparatuses for business use and factories. As solution means for this, there is a method of installing a microphone inside each apparatus for business use to daily monitor operation sounds of the apparatus. This method solves the above problem by analyzing the operation sounds collected by the microphone and, if a sound thought to be anomalous (hereinafter called "an anomalous sound") occurs, detecting the sound and issuing an alert. A technique for judging whether a monitoring target is in a normal state or in an anomalous state using sounds is called anomalous sound detection.

It costs much to set kinds of anomalous sounds and a detection method for each apparatus type and for each individual apparatus. Therefore, it is desirable to be capable of automatically designing rules for detecting an anomalous sound. As a method for solving this, anomalous sound detection based on a statistical approach is known (see, for example, Non-patent literature 1). The anomalous sound detection based on a statistical approach can be roughly classified in supervised anomalous sound detection and unsupervised anomalous sound detection. In the supervised anomalous sound detection, a large amount of learning data of normal sounds and anomalous sounds is collected, and a discriminator is learned so that a rate of discrimination is maximized. In the unsupervised anomalous sound detection, probability distribution of features of learning data of normal sounds (a normal model) is learned, and, if a newly collected sound is similar to the normal model (if likelihood is high), the sound is judged to be normal. If the sound is not similar (if the likelihood is low), the sound is judged to be anomalous. In industrial application, it is difficult to collect a large amount of learning data of anomalous sounds, and, therefore, the unsupervised anomalous sound detection is adopted in many cases.

PRIOR ART LITERATURE

Non-Patent Literature

Non-patent literature 1: "Anomaly Detection and Change Detection", Tsuyoshi Ide and Masashi Sugiyama, Kodansha, pp. 6-7, 2015

SUMMARY OF THE INVENTION

Problems to be Solved by the Invention

When an anomalous sound detection system is being operated, an anomalous sound may be overlooked as a rare case. If the overlook is left as it is, there is a possibility that the overlook leads to a serious accident. Therefore, it is necessary to update the anomalous sound detection system so as not to overlook the same anomalous sound again, using the anomalous sound that could be collected then. However, since an amount of data of anomalous sounds that can be obtained is overwhelmingly small in comparison with an amount of data of normal sounds, it is still difficult to apply supervised anomalous sound detection.

In view of the above point, an object of the present invention is to improve accuracy of unsupervised anomalous sound detection using an obtained small number of pieces of anomalous sound data.

Means to Solve the Problems

In order to solve the above problem, an anomalous sound detection apparatus of a first aspect of the present invention includes: a model storing part storing a normal model learned with pieces of normal sound data and an anomaly model learned with pieces of anomalous sound data; an anomaly score acquiring part calculating an anomaly score for inputted target data using the normal model and the anomaly model; and a state judging part comparing the anomaly score with a predetermined threshold to judge whether the target data is normal or anomalous. The anomaly model is obtained by deciding a minimum value among anomaly scores calculated for the plurality of pieces of anomalous sound data using at least the normal model as a learning threshold and deciding weights using a plurality of pieces of normal sound data, the pieces of anomalous sound data and the threshold so that all the pieces of anomalous sound data are judged as anomalous, and a probability of the pieces of normal sound data being judged as anomalous is minimized.

In order to solve the above problem, an anomaly model learning apparatus of a second aspect of the present invention includes: a threshold deciding part calculating an anomaly score for each of a plurality of pieces of anomalous sound data, using a normal model learned with normal sound data and an anomaly model expressing the pieces of anomalous sound data, and deciding a minimum value among the anomaly scores as a threshold; and a weight updating part updating, using a plurality of pieces of normal sound data, the pieces of anomalous sound data and the threshold, the weights of the anomaly model so that all the pieces of anomalous sound data are judged as anomalous, and probability of the pieces of normal sound data being judged as anomalous is minimized.

In order to solve the above problem, an anomaly detection apparatus of a third aspect of the present invention includes: a model storing part storing a normal model learned with pieces of normal data that are time-series data during a normal time and an anomaly model learned with pieces of anomalous data that are time-series data during an anomalous time; an anomaly score acquiring part calculating an anomaly score for inputted target data using the normal model and the anomaly model; and a state judging part comparing the anomaly score with a predetermined threshold to judge whether the target data is normal or anomalous. The anomaly model is obtained by deciding a minimum value among anomaly scores calculated for the plurality of pieces of anomalous data using at least the normal model as a learning threshold and deciding weights using a plurality of pieces of normal data, the pieces of anomalous data and the threshold so that all the pieces of anomalous data are judged as anomalous, and a probability of the pieces of normal data being judged as anomalous is minimized.

In order to solve the above problem, an anomalous sound detection apparatus of a fourth aspect of the present invention includes: a model storing part storing a first anomaly model that is probability distribution obtained by modeling pieces of anomalous sound data prepared beforehand and a second anomaly model that is probability distribution obtained by modeling additional anomalous sounds that are anomalous sounds different from the pieces of anomalous sound data; an anomaly score acquiring part calculating an anomaly score for inputted target sound data by combining the first anomaly model and the second anomaly model; and a state judging part comparing the anomaly score with a predetermined threshold to judge whether the target sound data indicates a normal sound or an anomalous sound.

In order to solve the above problem, an anomalous sound generation apparatus of a fifth aspect of the present invention is an anomalous sound generation apparatus generating pseudo-anomalous sounds at least based on obtained anomalous sounds, the anomalous sound generation apparatus including: an anomaly distribution acquiring part obtaining, from the obtained anomalous sounds or values based on the obtained anomalous sounds, anomaly distribution that is probability distribution followed by anomalous sounds; and an anomalous sound generating part generating the pseudo-anomalous sounds such that a probability of the pseudo-anomalous sounds being generated from the anomaly distribution is high, and a probability of the pseudo-anomalous sounds being generated from probability distribution followed by normal sounds is low.

In order to solve the above problem, an anomalous data generation apparatus of a sixth aspect of the present invention is an anomalous data generation apparatus generating pseudo-anomalous data at least based on obtained anomalous data, the anomalous data generation apparatus including: an anomaly distribution acquiring part obtaining, from the obtained anomalous data or values based on the obtained anomalous data, anomaly distribution that is probability distribution followed by anomalous data; and an anomalous data generating part generating the pseudo-anomalous data such that a probability of the pseudo-anomalous data being generated from the anomaly distribution is high, and a probability of the pseudo-anomalous data being generated from probability distribution followed by normal data is low.

In order to solve the above problem, an anomaly model learning apparatus of a seventh aspect of the present invention includes: an anomaly distribution acquiring part obtaining, from obtained anomalous sounds or values based on the obtained anomalous sounds, anomaly distribution that is probability distribution followed by anomalous sounds; and an anomalous sound generating part generating pseudo-anomalous sounds such that a probability of the pseudo-anomalous sounds being generated from the anomaly distribution is high, and a probability of the pseudo-anomalous sounds being generated from probability distribution followed by normal sounds is low; a threshold setting part setting a threshold such that all anomaly scores calculated from the pseudo-anomalous sounds are judged as anomalous; and a model updating part updating parameters of an anomaly model using obtained normal sounds, the obtained anomalous sounds or the values based on the obtained anomalous sounds and the threshold so that an anomalous sound is certainly judged as anomalous, and a probability of a normal sound being judged as anomalous is minimized.

Effects of the Invention

According to an anomalous sound detection technique of the present invention, since anomalous sound detection is performed using such an anomaly model that all of an obtained small number of pieces of anomalous sound data are anomalous, and a probability of a large number of pieces of normal sound data being misjudged as anomalous is minimized, accuracy of unsupervised anomalous sound detection is improved.

DETAILED DESCRIPTION OF THE EMBODIMENTS

Figure 1:
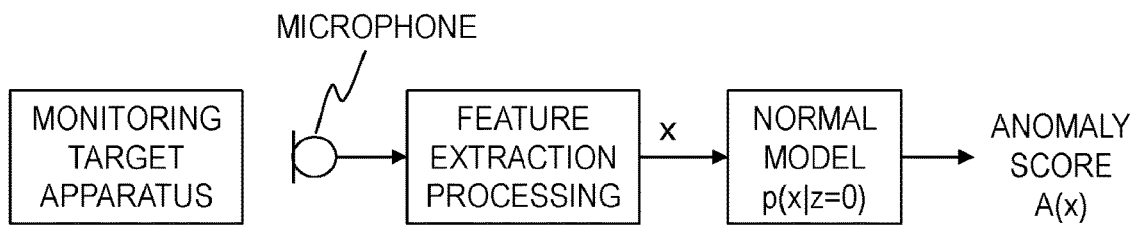
FIG. 1 is a diagram for describing conventional unsupervised anomalous sound detection.

Embodiments of the present invention will be described below in detail. In drawings, component parts having the same functions are given the same reference numerals, and duplicate description will be omitted.

First Embodiment

In the present embodiment, an anomaly model (or a penalty) is estimated from a small number of pieces of anomalous sound data, and an anomaly score is calculated using the anomaly model. For the estimation of the anomaly model, a kernel density estimation method is used. In the present invention, the anomaly model is not estimated using equal mixture weights for all pieces of anomalous sound data as done in a conventional kernel density estimation method, but the anomaly model is calculated using such a weight that maximizes accuracy of anomalous sound detection. In order to realize it, in the present invention, an algorithm is implemented which optimizes a weight to minimize a probability of misjudging normal sound data as anomalous (a false positive rate) under an anomaly judgment threshold capable of judging all obtained pieces of anomalous sound data as anomalous.

<Unsupervised Anomalous Sound Detection>

A conventional unsupervised anomalous sound detection technique will be described with reference to FIG. 1. In anomalous sound detection, first, an operation sound of a monitoring target apparatus is recorded with a microphone to obtain an observed signal x. Here, the observed signal x may be an audio waveform, a spectrum obtained by performing fast Fourier transform (FFT) for an audio waveform, or a vector obtained by extracting features using a neural network or the like. Next, an anomaly score $A(x)$ is calculated from the observed signal x, using a normal model. If the anomaly score $A(x)$ is equal to or above a threshold $\phi$ determined beforehand, the observed signal x is judged to be an anomalous sound.

In unsupervised anomalous sound detection, it is common to determine the anomaly score $A(x)$ like Formulas (1) and (2).

$$A(x) = -\ln \frac{p(x|\text{normal})}{p(x|\text{anomalous})} \# \quad (1)$$

$$= -\ln \frac{p(x|z=0)}{p(x|z=1)} \# \quad (2)$$

Here, $p(x|z=0)$ indicates a probability of the observed signal x being a sound made by an apparatus in a normal state (a normal model), and $p(x|z=1)$ indicates a probability of the observed signal x being a sound made by an apparatus in an anomalous state (an anomaly model). The normal model and the anomaly model are determined from pieces of data (learning data) obtained by recording sounds made by the apparatuses in the normal state and the anomalous state, respectively. In most cases, however, it is difficult to collect data (anomalous sound data) obtained by recording sounds made by an apparatus in an anomalous state. Therefore, in the unsupervised anomalous sound detection, it is common to model an anomaly model with uniform distribution as shown by Formula (3).

$$p(x|z=1) = \text{Uniform}[R^D] = C \quad (3)$$

Here, R indicates a set of all real numbers; D indicates a dimensionality of x; and C indicates a positive constant. By substituting Formula (3) into Formula (2), Formula (4) is obtained.

$$A(x) = -\ln p(x|z=0) + \ln C \propto -\ln p(x|z=0) \quad (4)$$

Figure 2:
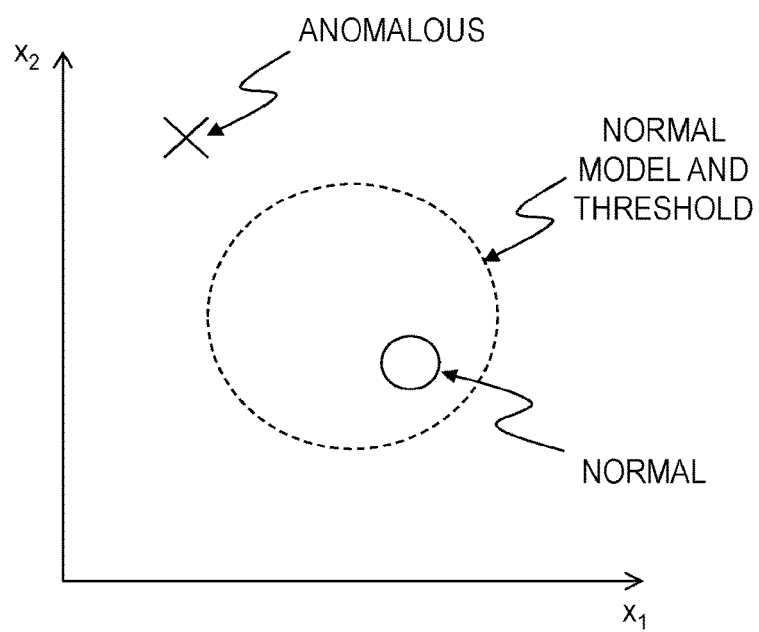
FIG. 2 is a diagram showing a concept of the conventional unsupervised anomalous sound detection.

That is, in the unsupervised anomalous sound detection, when the observed signal x cannot be said to have been generated from the normal model $p(x|z=0)$, the observed signal x is judged to be an anomalous sound. FIG. 2 is a conceptual diagram showing anomalous sound detection for an observed signal $x=(x_1, x_2)$ by the conventional unsupervised anomalous sound detection. A dashed circle in FIG. 2 indicates a normal model, and the circumference of the circle indicates a threshold for judging whether normal or anomalous. An observed signal indicated by a circle mark is judged to be normal because it is located in the normal model, and an observed signal indicated by a cross mark is judged to be anomalous because it is located outside the normal model.

Principle of Present Embodiment

When an anomalous sound detection system is being operated, anomalous sound data may be collected as a rare case. An object of the present embodiment is to improve accuracy of anomalous sound detection using a small number of pieces of anomalous sound data obtained during operation.

<<Advancement of Anomalous Sound Detection Using a Small Number of Pieces of Anomalous Sound Data>>

Figure 3:
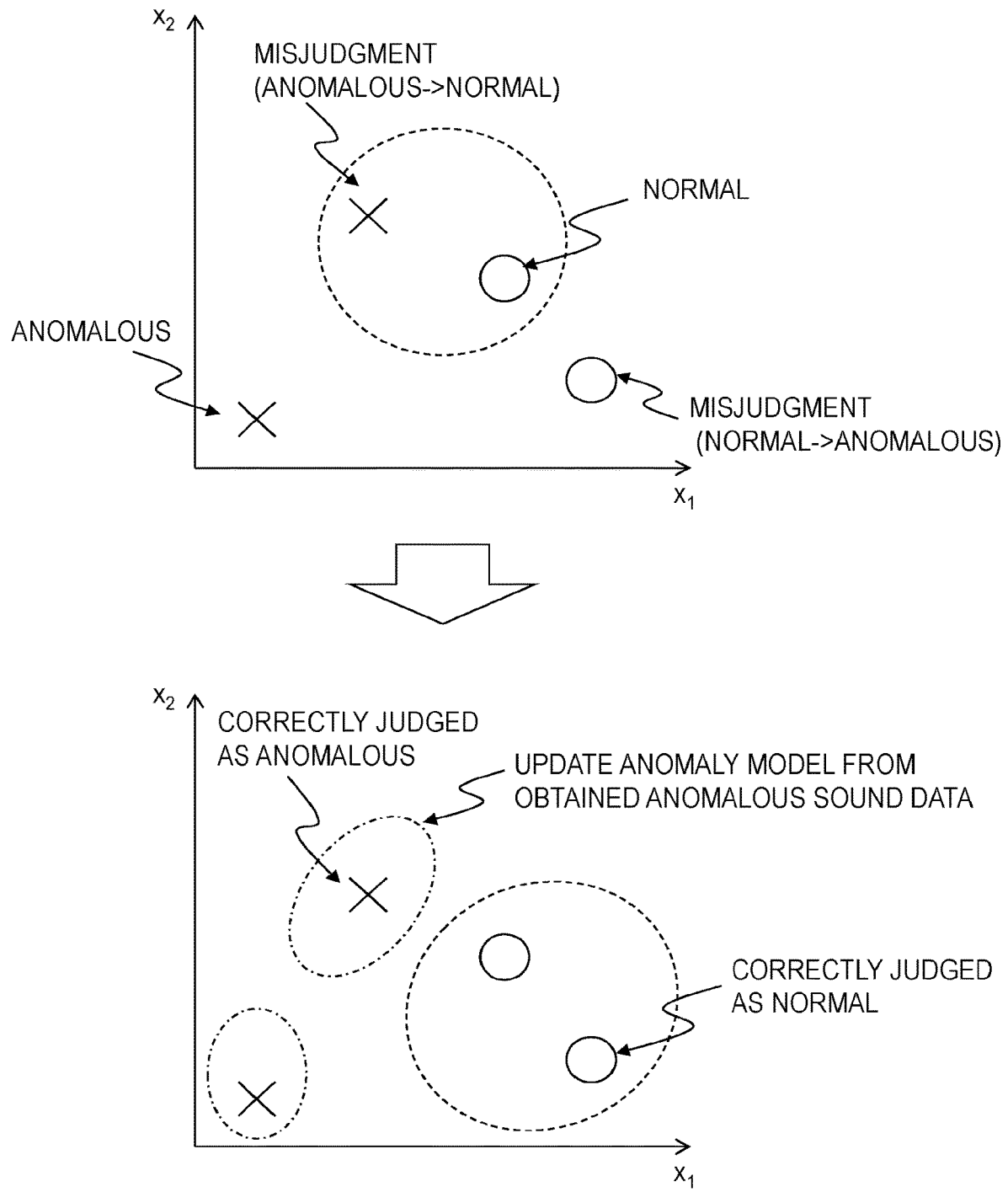
FIG. 3 is a diagram showing a concept of unsupervised anomalous sound detection of the present invention.

In the conventional unsupervised anomalous sound detection, an anomalous sound is expressed by the anomaly model $p(x|z=1)$. Further, in conventional setting of a subject, since it is assumed that anomalous sound data cannot be obtained at all, the anomaly model $p(x|z=1)$ is modeled with uniform distribution. In the present invention, it is considered to estimate the anomaly model $p(x|z=1)$ using an obtained small number of pieces of anomalous sound data $\{x_n\}_{n=1}^{N}$ as shown in FIG. 3. The example in FIG. 3 shows that, though a misjudgment of an observed signal, which should be originally anomalous, being judged to be normal because it is in a normal model (dashed line) and a misjudgment of an observed signal, which should be originally normal, being judged to be anomalous because it is outside the normal model (dashed line) occur in the conventional unsupervised anomalous sound detection, a judgment is correctly made by estimating an anomaly model (a long dashed short dashed line) from obtained anomalous sound data.

For example, the kernel density estimation method can be applied to a method for estimating an anomaly model using a small number of pieces of anomalous sound data. When the kernel density estimation method is applied to estimation of an anomaly model, the anomaly model $p(x|z=1)$ can be expressed like Formula (5).

$$p(x|z=1) = \frac{\alpha}{N+\alpha} C + \sum_{n=1}^{N} \frac{1}{N+\alpha} p_n(x|x_n) \quad (5)$$

Here, $0 \leq \alpha$ is satisfied, and $p_n(x|x_n)$ indicates probability distribution estimated from the n-th piece of anomalous sound data $x_n$.

For the probability distribution $p_n(x|x_n)$, for example, Gaussian distribution of Formula (6) can be used.

$$p_n(x|x_n) = \frac{1}{\sqrt{2\pi\sigma^2}} \exp\left\{-\frac{\|x-x_n\|_2^2}{2\sigma^2}\right\} \quad (6)$$

Here, $\sigma(>0)$ indicates a variance parameter.

For the probability distribution $p_n(x|x_n)$, the von Mises distribution of Formula (7) or the like can also be used in addition to the Gaussian distribution of Formula (6).

$$p_n(x|x_n) = \frac{1}{Z(K)} \exp\left\{ K \frac{x^T x_n}{\|x\|_2 \|x_n\|_2} \right\} \quad (7)$$

Here, $T$ indicates a vector transpose; $\kappa$ indicates a concentration parameter; and $Z(\kappa)$ indicates a normalization constant.

Then, the anomaly score $A(x)$ can be calculated like Formulas (8) and (9).

$$A(x) = -\ln \frac{p(x|z=0)}{\frac{\alpha}{N+\alpha}C + \sum_{n=1}^{N} \frac{1}{N+\alpha} p_n(x|x_n)} \quad (8)$$

$$= -\ln p(x|z=0) + \ln\left[\frac{\alpha}{N+\alpha}C + \sum_{n=1}^{N} \frac{1}{N+\alpha} p_n(x|x_n)\right] \quad (9)$$

Figure 4:
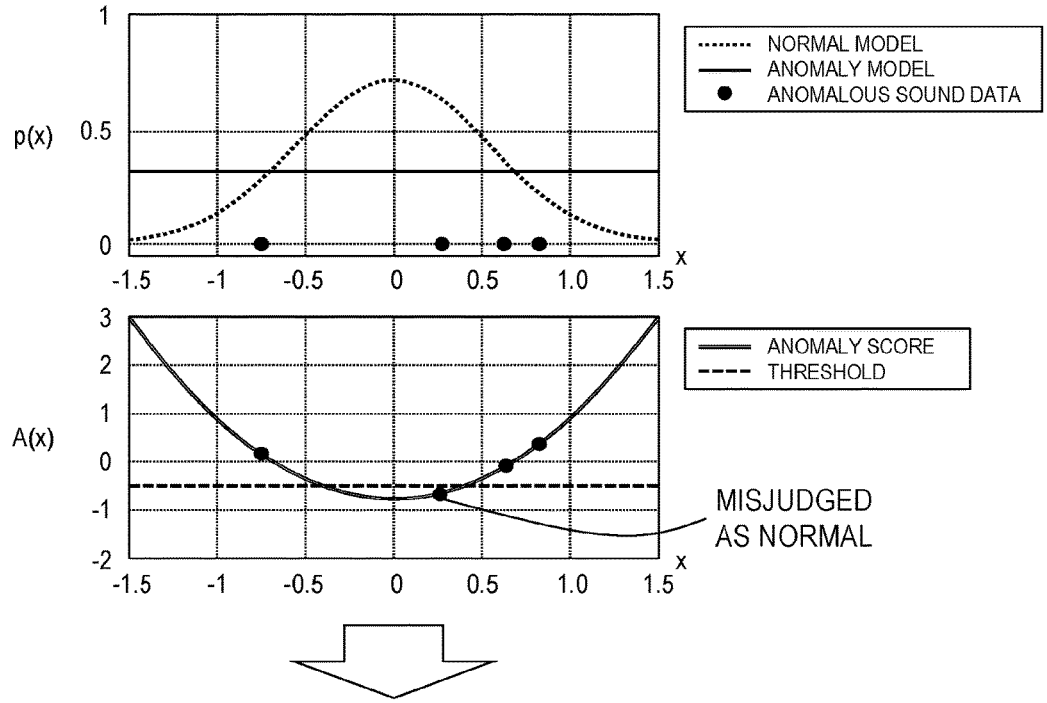
FIG. 4 is a diagram illustrating update of an anomaly model and change in anomaly score.
Figure 4:
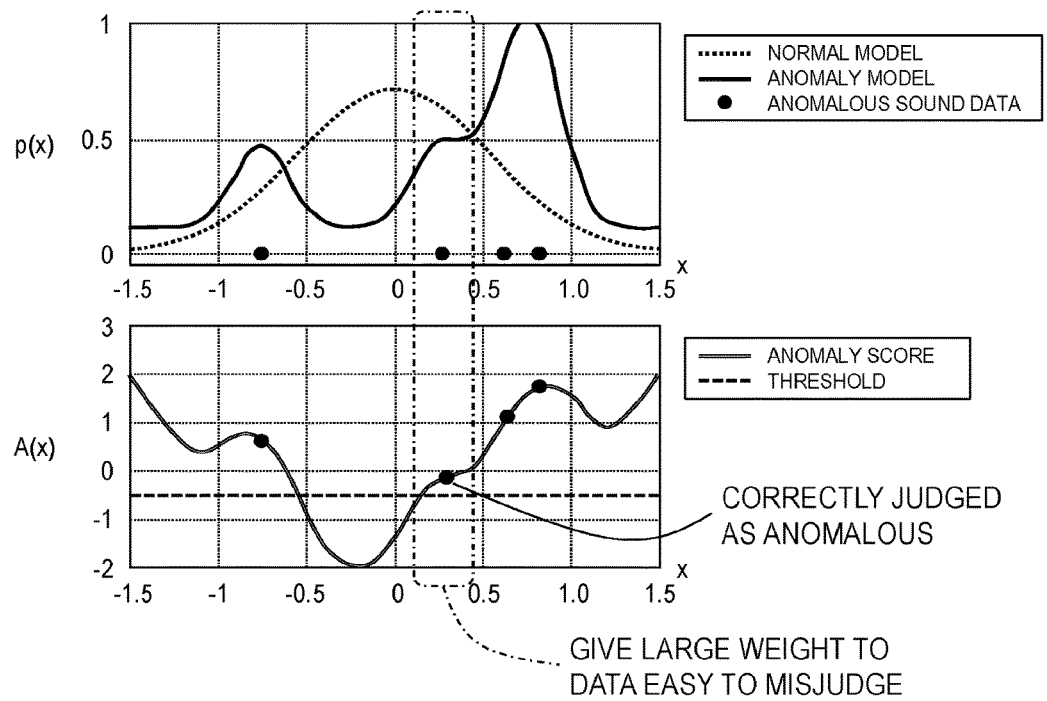

By estimating an anomaly model using Formulas (8) and (9), the anomaly score changes as illustrated in FIG. 4. That is, since a penalty proportional to $\ln p_n(x|x_n)$ is given to the anomaly score $A(x)$ of an observed signal $x$ that is similar to the obtained anomalous sound data, there is an effect that it becomes easy to judge an observed signal $x$ similar to anomalous sound data $x_n$ as an anomalous sound.

<<Problem of Weighting Each Piece of Anomalous Sound Data>>

A final object of anomalous sound detection is to correctly judge whether the observed signal $x$ is a normal sound or an anomalous sound and is not to accurately estimate an anomaly model. In other words, it is only required to correctly judge whether the observed signal $x$ is a normal sound or an anomalous sound, and it is not necessary to accurately determine an anomaly model in terms of histogram as in the conventional kernel density estimation method.

In the present embodiment, different weights $w_n$ are given to N probability distributions $p_n(x|x_n)$ in the kernel density estimation method to estimate an anomaly model. That is, Formula (5) is changed to Formula (10).

$$p(x|z=1) = \frac{\alpha}{N+\alpha}C + \sum_{n=1}^{N} \frac{w_n}{N+\alpha} p_n(x|x_n) \quad (10)$$

It is assumed that the weight $w_n$ has the following nature.

$$\sum_{n=1}^{N} w_n = N \quad (11)$$

The anomaly score $A(x)$ can be calculated like Formulas (12) and (13).

$$A(x) = -\ln \frac{p(x|z=0)}{\frac{\alpha}{N+\alpha}C + \sum_{n=1}^{N} \frac{w_n}{N+\alpha} p_n(x|x_n)} \quad (12)$$

$$= -\ln p(x|z=0) + \ln\left[\frac{\alpha}{N+\alpha}C + \sum_{n=1}^{N} \frac{w_n}{N+\alpha} p_n(x|x_n)\right] \quad (13)$$

By estimating an anomaly model using Formulas (12) and (13), the anomaly score changes as shown in FIG. 4. That is, this weighting has a function of causing the whole misjudgment rate to decrease, by giving a large weight $w_n$ to such anomalous sound data $x_n$ that is likely to be misjudged as a normal sound. Here, problems are the following two points: (1) which kind of nature an optimal weight satisfies; and (2) which kind of objective function is to be used to optimize a weight.

<<False Positive Rate Minimization Indicator and Optimization Algorithm>>

An algorithm to determine an optimal weight $w_n$, which is a central part of the present embodiment, will be described below. In evaluation of accuracy of the anomalous sound detection system, it is common to use a true positive rate (TPR; a probability of being capable of correctly judging an anomalous sound as an anomalous sound) and a false positive rate (FPR; a probability of wrongly judging a normal sound as an anomalous sound). Here, TPR and FPR can be determined as follows.

$$\text{TPR}(\phi, w_n) = \int H[A(x) - \phi] p(x|z=1) dx \quad (14)$$

$$\text{FPR}(\phi, w_n) = \int H[A(x) - \phi] p(x|z=0) dx \quad (15)$$

Here, $H[x]$ indicates a judgment function that is 1 when $x \geq 0$ is satisfied, and is 0 when $x < 0$ is satisfied. Since an anomalous sound detection system with a high true positive rate (TPR) and a low false positive rate (FPR) has good performance, a system that minimizes the following indicator has the best performance.

$$\text{FPR}(\phi, w_n) - \text{TPR}(\phi, w_n) \quad (16)$$

In an anomalous sound detection system, it is a more important problem to overlook anomalous sound data. Therefore, it is desired to certainly judge N pieces of anomalous sound data as anomalous. In order to satisfy this, it is only required that the true positive rate (TPR) determined from the N pieces of anomalous sound data is 1.

$$\text{TPR}(\phi, w_n) = \frac{1}{N} \sum_{n=1}^{N} H[A(x_n) - \phi] = 1 \quad (17)$$

From the above, an optimal anomalous sound detection system is only required to satisfy both of the minimization of Formula (16) and the restriction of Formula (17) for preventing recurrence of overlook simultaneously. In other words, it is only required to update the weight so that the false positive rate is minimized under a threshold capable of judging all obtained pieces of anomalous sound data as anomalous. The optimization of the weight $w_n$ can be executed by solving the constrained optimization problem of Formulas (18) to (20).

$$w \leftarrow \underset{w}{\arg\min} J(w) \text{ s.t.} \begin{cases} \text{TPR}(\phi_w, w_n) = 1 \\ \sum_{n=1}^{N} w_n = N \end{cases} \quad (18)$$

-continued $$J(w) = FPR(\phi_w, w_n) \quad (19)$$

$$w = (w_1, w_2, \ldots, w_N)^T \quad (20)$$

Here, $\phi_w$ indicates a threshold that satisfies Formula (17) when $w_n$ is given.

Optimization of Formula (18) can be executed using a proximal gradient method or the like. To execute the gradient method, an objective function $J(w)$ is transformed into a partially differentiable form with respect to the weight $w_n$. It is a judgment function $H[A(x_n), \phi]$ that cannot be differentiated with respect to the weight $w_n$ in the objective function $J(w)$. Here, the judgment function is approximated with a sigmoid function that is a smooth function.

$$FPR(\phi_w, w_n) \approx \frac{1}{K} \sum_{k=1}^{K} \text{sigmoid}\{A(x_k) - \phi_w\} \quad (21)$$

$$\text{sigmoid}\{x\} = \frac{1}{1 + \exp\{-x\}} \quad (22)$$

Then, update of the weight $w_n$ can be executed by Formulas (23) to (27).

$$w \leftarrow w - \lambda \nabla_w J(w) \quad (23)$$

$$\nabla_w J(w) = (\nabla_{w_1} J(w), \nabla_{w_2} J(w), \ldots, \nabla_{w_N} K(w))^T \quad (24)$$

$$\nabla_{w_n} J(w) = \frac{1}{K} \sum_{k=1}^{K} \nabla_{w_n} S_k \nabla_{w_n} A(x_k) \quad (25)$$

$$\nabla_{w_n} S_k = \text{sigmoid}\{A(x_k) - \phi_w\}(1 - \text{sigmoid}\{A(x_k) - \phi_w\}) \quad (26)$$

$$\nabla_{w_n} A(x_k) = \frac{\frac{1}{N+\alpha} p_n(x_k|x_n)}{\frac{\alpha}{N+\alpha} C + \sum_{n=1}^{N} \frac{w_n}{N+\alpha} p_n(x_k|x_n)} \quad (27)$$

Here, $\lambda(>0)$ indicates a step size of the gradient method, and $\nabla x$ indicates partial differentiation with respect to x.

A first embodiment of the present invention will be described below in detail. The first embodiment of the present invention is configured with an anomaly model learning apparatus 1 that estimates an anomaly model used for anomalous sound detection and an anomalous sound detection apparatus 2 that judges whether an observed signal is normal or anomalous using the anomaly model learned by the anomaly model learning apparatus 1.

<<Anomaly Model Learning Apparatus>>

Figure 5:
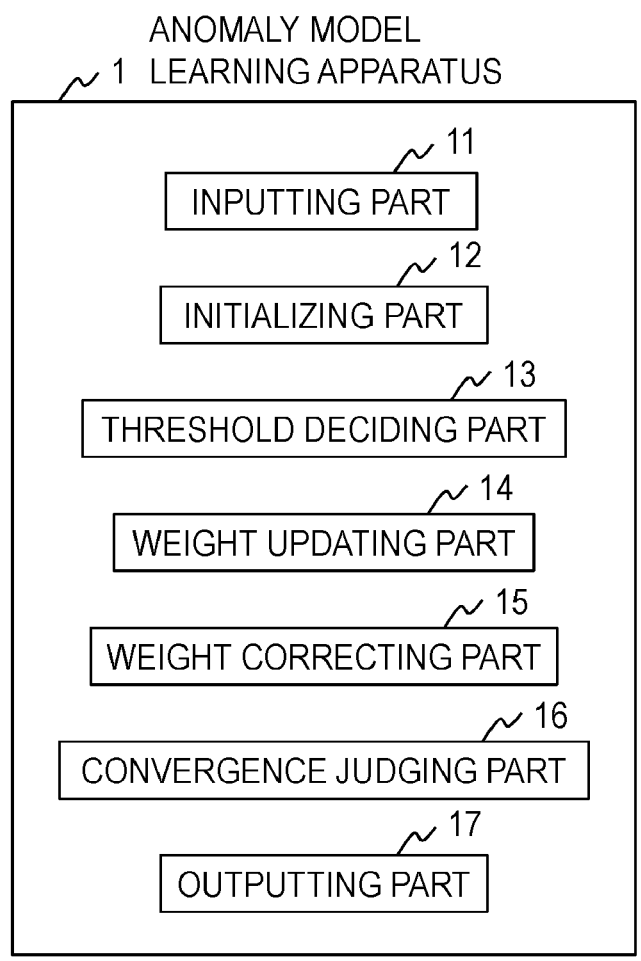
FIG. 5 is a diagram illustrating a functional configuration of an anomaly model learning apparatus.

The anomaly model learning apparatus 1 of the first embodiment includes an inputting part 11, an initializing part 12, a threshold deciding part 13, a weight updating part 14, a weight correcting part 15, a convergence judging part 16 and an outputting part 17 as illustrated in FIG. 5. By this anomaly model learning apparatus 1 performing processing of each step illustrated in FIG. 6, an anomaly model learning method of the first embodiment is realized.

The anomaly model learning apparatus 1 is, for example, a special apparatus configured by a special program being read into a publicly known or dedicated computer having a central processing unit (CPU), a main memory (RAM: random access memory) and the like. For example, the anomaly model learning apparatus 1 executes each processing under control of the central processing unit. Data inputted to the anomaly model learning apparatus 1 and data obtained by each processing are stored, for example, into the main memory, and the data stored in the main memory is read out to the central processing unit and used for other processing as necessary. At least a part of each processing part of the anomaly model learning apparatus 1 may be configured with hardware such as an integrated circuit.

Figure 6:
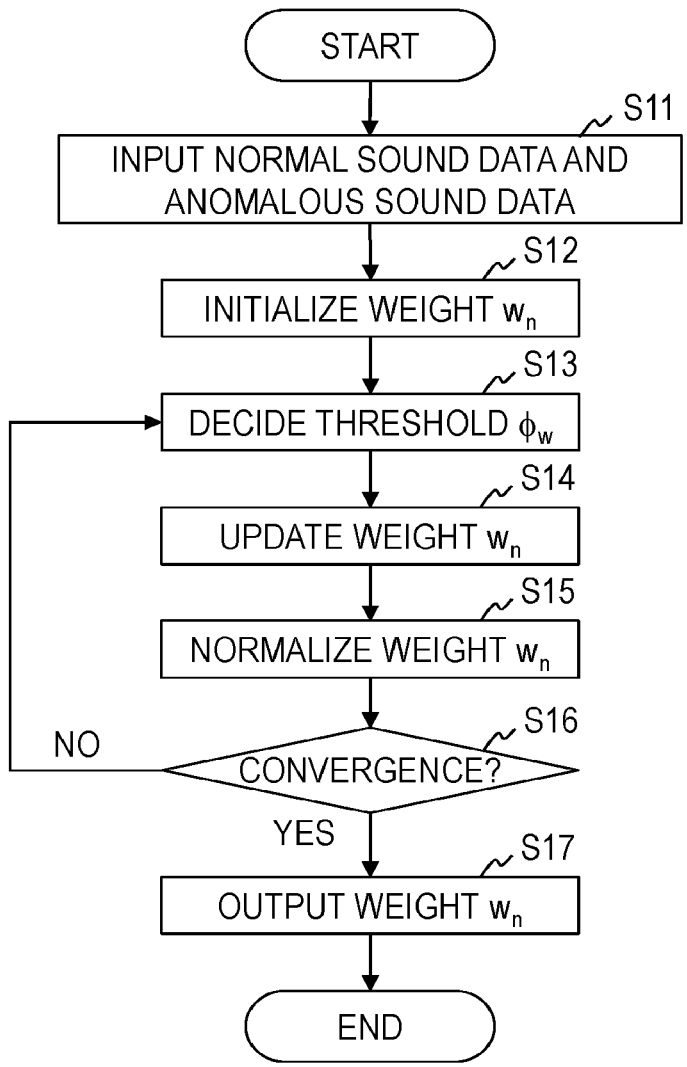
FIG. 6 is a diagram illustrating a process procedure for an anomaly model learning method.

The anomaly model learning method executed by the anomaly model learning apparatus 1 of the first embodiment will be described below with reference to FIG. 6.

At step S11, the inputting part 11 receives a normal model $p(x|z=0)$, normal sound data $\{x_k\}_{k=1}^{K}$, anomalous sound data $\{x_n\}_{n=1}^{N}$, a uniform distribution weight $\alpha$, a uniform distribution constant C and a step size $\lambda$ of the gradient method as an input. Each of the parameters $\alpha$, C and $\lambda$ is required to be tuned, and can be set, for example, to approximately $\alpha=N$, $C=0.05$ and $\lambda=10^{-3}$. The normal model $p(x|z=0)$ is probability distribution estimated using normal sound data and is similar to a normal model used in the conventional unsupervised anomalous sound detection. The normal sound data $\{x_k\}_{k=1}^{K}$ is a large amount of sound data obtained by recording sounds made by an apparatus in a normal state. The anomalous sound data $\{x_n\}_{n=1}^{N}$ is a small amount of sound data obtained by recording sounds made by the apparatus in an anomalous state. Though it is preferable that the inputted normal sound data $\{x_k\}_{k=1}^{K}$ is the same as the normal sound data used to learn the normal model $p(x|z=0)$, it is not necessarily required to be the same.

At step S12, the initializing part 12 initializes the weights $w_n$ (n=1, ..., N). For example, the initialization can be performed with $w_n \leftarrow 1/N$.

At step S13, the threshold deciding part 13 calculates Formula (13) for each of pieces of anomalous sound data $x_n$(n=1, ..., N) and decides a minimum value min($A(x_n)$) among obtained anomaly scores $A(x_n)$(n=1, ..., N) as the threshold $\phi_w$. The threshold deciding part 13 outputs the obtained threshold $\phi_w$ to the weight updating part 14.

At step S14, the weight updating part 14 updates the weight $w_n$ so that all the pieces of anomalous sound data $\{x_n\}_{n=1}^{N}$ are judged to be anomalies, and a probability of the normal sound data $\{x_k\}_{k=1}^{K}$ being judged to be anomalous is minimized. For this purpose, the weight updating part 14 updates the weight $w_n$ such that a larger weight is given as the anomaly score $A(x_n)$ calculated for the anomalous sound data $x_n$ is smaller. Specifically, the weight updating part 14 calculates Formula (23) to update the weight $w_n$. At this time, if K is large, that is, the number of pieces of normal sound data $\{x_k\}_{k=1}^{K}$ is large, Formula (23) may be calculated using K' pieces of normal sound data randomly selected from among the pieces of normal sound data $\{x_k\}_{k=1}^{K}$. Here, K' can be tuned according to calculation resources or a desired judgment accuracy and can be set, for example, to 128 or 1024. The weight updating part 14 outputs the updated weights $w_n$(n=1, ..., N) to the weight correcting part 15.

At step S15, the weight correcting part 15 receives the weights $w_n$ (n=1, ..., N) from the weight updating part 14 and corrects each of the weights $w_n$ so that the weights $w_n$(n=1, ..., N) satisfy the restriction. For example, if there is a weight $w_n$ satisfying $w_n<0$ among the weights $w_n$, the weight $w_n$ can be corrected by setting $w_n=0$ and calculating Formula (28).

$$w_n \leftarrow N \frac{w_n}{\sum_{n=1}^{N} w_n} \quad (28)$$

At step S16, the convergence judging part 16 judges whether a predetermined end condition is satisfied or not. The convergence judging part 16 advances the process to step S17 if the end condition is satisfied, and returns the process to step S13 if the end condition is not satisfied. As the end condition, for example, it can be set that repetition of steps S13 to S15 has been executed one hundred times.

At step S17, the outputting part 17 outputs the weights $w_n(n=1, \ldots, N)$.

<<Anomalous Sound Detection Apparatus>>

Figure 7:
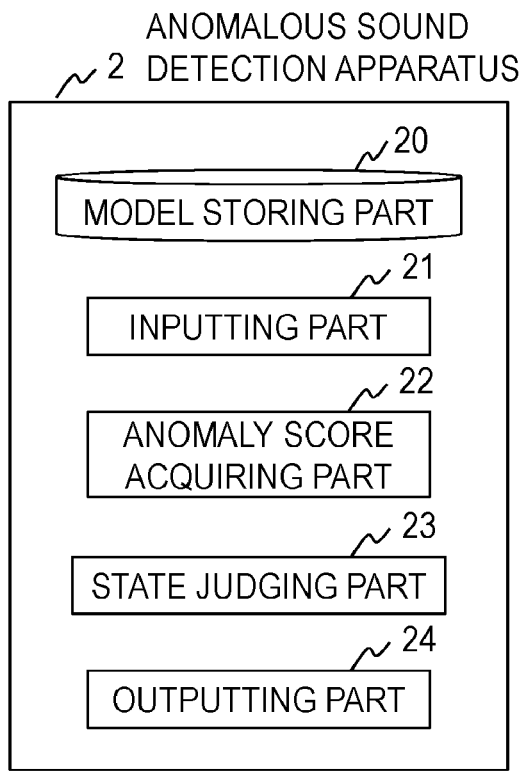
FIG. 7 is a diagram illustrating a functional configuration of an anomalous sound detection apparatus.

The anomalous sound detection apparatus 2 of the first embodiment includes a model storing part 20, an inputting part 21, an anomaly score acquiring part 22, a state judging part 23 and an outputting part 24 as illustrated in FIG. 7. By this anomalous sound detection apparatus 2 performing processing of each step illustrated in FIG. 8, an anomalous sound detection method of the first embodiment is realized.

The anomalous sound detection apparatus 2 is, for example, a special apparatus configured by a special program being read into a publicly known or dedicated computer having a central processing unit (CPU), a main memory (RAM: random access memory) and the like. For example, the anomalous sound detection apparatus 2 executes each processing under control of the central processing unit. Data inputted to the anomalous sound detection apparatus 2 and data obtained by each processing are stored, for example, into the main memory, and the data stored in the main memory is read out to the central processing unit and used for other processing as necessary. At least a part of each processing part of the anomalous sound detection apparatus 2 may be configured with hardware such as an integrated circuit. Each storing part the anomalous sound detection apparatus 2 is provided with can be configured, for example, with a main memory such as a RAM (random access memory), an auxiliary storage device configured with a hard disk, an optical disc, or a semiconductor memory device like a flash memory, or middleware such as a relational database or a key-value store.

In the model storing part 20, the normal model $p(x|z=0)$, the anomaly model $p(x|z=1)$ and the threshold $\phi$ are stored. The normal model $p(x|z=0)$ is a model obtained by estimating probability distribution using normal sound data similarly to the anomaly model learning apparatus 1, and is similar to a normal model used in the conventional unsupervised anomalous sound detection. The anomaly model $p(x|z=1)$ is a model obtained by learning the weights $w_n(n=1, \ldots, N)$ using the anomalous sound data $\{x_n\}_{n=1}^{N}$ by the anomaly model learning apparatus 1. The threshold $\phi$ may be the threshold $\phi_w$ decided by the threshold deciding part 13 of the anomaly model learning apparatus 1 or may be a threshold manually given beforehand.

Figure 8:
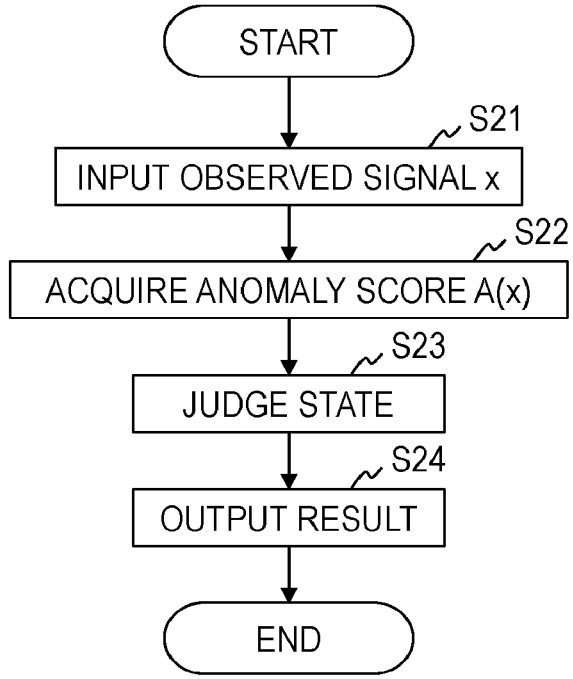
FIG. 8 is a diagram illustrating a process procedure for an anomalous sound detection method.

The anomalous sound detection method executed by the anomalous sound detection apparatus 2 of the first embodiment will be described below with reference to FIG. 8.

At step S21, the inputting part 21 receives an observed signal x targeted by anomalous sound detection as an input. The inputting part 21 outputs the observed signal x to the anomaly score acquiring part 22.

At step S22, the anomaly score acquiring part 22 receives the observed signal x from the inputting part 21, calculates Formula (13) and obtains an anomaly score A(x). The anomaly score acquiring part 22 outputs the obtained anomaly score A(x) to the state judging part 23.

At step S23, the state judging part 23 receives the anomaly score A(x) from the anomaly score acquiring part 22 and compares the anomaly score A(x) and the threshold $\phi$ to judge whether the observed signal x is normal or anomalous. The state judging part 23 outputs a judgment result to the outputting part 24.

At step S24, the outputting part 24 receives the judgment result from the state judging part 23 and sets the judgment result as an output of the anomalous sound detection apparatus 2.

Modification of First Embodiment

Though anomalous sound detection targeting sound data has been described in the present embodiment, the present embodiment can be applied to data other than sound data. For example, the present embodiment can be applied to time-series data other than sound data, or image data. In order to apply the present embodiment to such data, it is only required to cause x to be suitable for the application target. In the case of vibration sensor or stock price data, what is obtained by collecting time-series information about the data or a result of performing Fourier transform thereof may be used as x. In the case of an image, features of the image or a result of analyzing the features by a neural network or the like may be used as x. In this case, the anomalous sound detection apparatus 2 functions as an anomaly detection apparatus that judges whether observed data is normal or anomalous, using a normal model obtained by learning normal data, which is data during a normal time, and an anomaly model obtained by learning anomalous data, which is data during an anomalous time.

Though it has been described in the present embodiment that a false positive rate is minimized using a small number of pieces of anomalous sound data, it is also possible to make a configuration so that a false negative rate is minimized using normal sound data. That is, as for the kind of targeted data or a targeted indicator, it is possible to appropriately change the kind or the indicator within a range not departing from the spirit of the present embodiment.

Though an example in which the anomaly model learning apparatus 1 and the anomalous sound detection apparatus 2 are configured as separate apparatuses has been described in the present embodiment, it is also possible to configure one anomalous sound detection apparatus provided with both of the function of learning an anomaly model and the function of performing anomalous sound detection using the learned anomaly model. That is, the anomalous sound detection apparatus of the modification includes the inputting part 11, the initializing part 12, the threshold deciding part 13, the weight updating part 14, the weight correcting part 15, the convergence judging part 16, the outputting part 17, the model storing part 20, the inputting part 21, the anomaly score acquiring part 22, the state judging part 23 and the outputting part 24.

Second Embodiment

In the present embodiment, there is provided a framework for improving accuracy of unsupervised anomalous sound detection using an obtained small number of pieces of anomalous sound data. In the present embodiment, an anomaly model (or a penalty) is estimated from a small number of pieces of anomalous sound data, and an anomaly score is calculated using the anomaly model. The anomaly model is defined as similarity between a small number of anomalous sounds and an observed signal. That is, to an observed signal similar to an anomalous sound that has been obtained before, a penalty causing the observed signal to be easily judged as anomalous is given. In order to learn this anomaly model, there is provided an algorithm that optimizes a weight to minimize a false positive rate, which is a probability of wrongly judging a normal observed signal as anomalous, under an anomaly judgment threshold capable of judging all obtained pieces of anomalous data as anomalous.

<Unsupervised Anomalous Sound Detection>

Anomalous sound detection is a task to judge whether a state of a monitoring target that has issued an input x is normal or anomalous. Here, what is obtained by lining up logarithmic amplitude spectra $\ln|X_{t,f}|$ of an observed signal, for example, like Formula (29) can be used as x.

$$x:=(\ln|X_{t-Q,1}|,\ln|X_{t-Q,2}|,\ldots,\ln|X_{t+Q,F}|)^T \quad (29)$$

Here, $t=\{1, 2, \ldots, T\}$ indicates a time index; $f=\{1, 2, \ldots, F\}$ indicates a frequency index; and Q indicates the number of frames in the past and the future considered for input. However, x is not limited thereto but may be a result of extracting features from an observed signal.

In anomalous sound detection based on a statistical method, an anomaly score A(x) is calculated from an input x as shown by Formula (30).

$$A(x) = -\ln\frac{p(x|z=0)}{p(x|z=1)} \quad (30)$$
$$= -\ln p(x|z=0) + \ln p(x|z=1)$$

Here, p(x|z=0) indicates a probability distribution of issuing x when a monitoring target is in a normal state (a normal model), and p(x|z=1) indicates a probability distribution of issuing x when the monitoring target is in an anomalous state (an anomaly model). Then, as shown by Formula (31), it is judged that the monitoring target is anomalous if the anomaly score A(x) is larger than the predefined threshold $\phi$, and normal if the anomaly score A(x) is smaller.

$$\text{Identification result}=H(A(x)-\phi) \quad (31)$$

Here, $H(\cdot)$ is a step function that returns 1 if an argument is non-negative and returns 0 if the argument is negative. The observed signal is judged to be anomalous if an identification result is 1 and judged to be normal if the identification result is 0.

The normal model and the anomaly model are required to be already known to calculate Formula (31). However, since each of the models is unknown, it is necessary to estimate the models from learning data. The normal model can be designed, for example, by learning the following Gaussian mixture model (GMM) from operation sound data in a normal state (normal data) collected beforehand.

$$p(x|z=0):=\sum_{k=1}^{K} w_k N(x|\mu_k,\Sigma_k) \quad (32)$$

Here, K indicates the number of mixtures; $N(x|\mu,\Sigma)$ indicates Gaussian distribution with a mean vector $\mu$ and a variance-covariance matrix $\Sigma$ as parameters; $w_k$ indicates a weight of the k-th distribution; $\mu_k$ indicates a mean vector of the k-th distribution; and $\Sigma_k$ indicates a variance-covariance matrix of the k-th distribution.

While it is easy to collect a large amount of normal data, it is difficult to collect operation sound data in an anomalous state (anomalous data). Therefore, in "unsupervised anomalous sound detection", it is common to omit an anomaly model and define the anomaly score A(x) as shown by Formula (33).

$$A(x)=-\ln p(x|z=0) \quad (33)$$

That is, in the unsupervised anomalous sound detection, an observed signal is judged to be normal if a normal model and the observed signal are similar and judged to be anomalous if the normal model and the observed signal are not similar.

Principle of Present Embodiment

When an unsupervised anomalous sound detection system is operated in an actual environment, anomalous data may be collected. For example, if the unsupervised anomalous sound detection system detects an anomalous state, anomalous data can be automatically obtained. Even if the unsupervised anomalous sound detection system overlooks an anomalous state, observed data so far can be used as anomalous data if the anomalous state is discovered by a manual inspection and the like after that. Especially in cases like the latter case, if overlooking of the anomalous state is continued, it leads to a serious accident. Therefore, the system should be updated using the anomalous data that could be observed. The present invention is a technique for improving accuracy of anomalous sound detection by learning an anomaly model using anomalous data obtained during operation as described above.

<<Design of Anomaly Model>>

It will be considered to estimate an anomaly model p(x|Y) from obtained N anomalous samples $Y:=\{y_n\}_{n=1}^{N}$. Since it is rare that a monitoring target enters an anomalous state, N is overwhelmingly smaller than the number of pieces of normal data. Therefore, it is difficult to model an anomaly model with a complicated statistic model like Gaussian mixture distribution. Therefore, in the present invention, an anomaly model of Formula (34) is designed.

$$p(x|Y):=\sum_{n=1}^{N} g_n K(x, y_n | \Theta_n) \quad (34)$$

Here, $K(x, y_n)$ indicates a function of calculating similarity between x and $y_n$; $g_n$ indicates a mixture weight of the n-th piece of anomalous data; and $\Theta_n$ indicates a parameter for calculating the similarity between x and $y_n$. That is, the anomaly score A(x) is calculated as Formula (35).

$$A(x) = -\ln p(x|z=0) + \ln\sum_{n=1}^{N} g_n K(x, y_n | \Theta_n) \quad (35)$$

That is, in the present embodiment, by defining an anomaly model as a function of calculating a weighted sum of similarities between obtained anomalous data and an observed signal, the unsupervised anomalous sound detection system is updated/corrected using the anomaly model as a penalty term that induces an observed signal to be judged as anomalous if obtained anomalous data and the observed signal are similar.

<<Design of Objective Function>>

In Formula (35) of the anomaly score in the present embodiment, parameters to be determined are $g_n$ and $\Theta_n$. In order to determine a parameter using learning data, it is required to appropriately design an "objective function" that mathematically describes "what parameter is a good parameter for a system". As for an objective function for anomalous sound detection, the objective function may be designed using AUC (area under the receiver operating characteristic curve) which is a bottom area of a curve when a horizontal axis is assumed to indicate a false positive rate (FPR) which is a probability of wrongly judging a normal observed signal as anomalous and a vertical axis is assumed to indicate a true positive rate (TPR) which is a probability of being capable of correctly judging an anomalous observed signal as anomalous. If the anomaly score is defined by Formula (35), the true positive rate (TPR) and the false positive rate (FPR) can be defined like Formulas (36) and (37).

$$\text{TPR}(\Theta, g_n, \phi) = \int H(A(x) - \phi) p(x|z=1) dx \quad (36)$$

$$\text{FPR}(\Theta, g_n, \phi) = \int H(A(x) - \phi) p(x|z=0) dx \quad (37)$$

In early research, learning was performed so that the whole AUC is maximized (see Reference Document 1 below). In comparison, in recent research, it has become clear that, by regarding unsupervised anomalous sound detection as hypothesis testing, performance of anomalous sound detection is improved by learning an unsupervised anomalous sound detection system so that a true positive rate is maximized under conditions for a certain risk rate (for example, a false positive rate) (see Reference Document 2 below). Such a concept is called "the Neyman-Pearson Standard".

Reference Document 1: A. P. Bradley, "The Use of the Area Under the ROC Curve in the Evaluation of Machine Learning Algorithms," Pattern Recognition, pp. 1145-1159, 1996.

Reference Document 2: Y. Koizumi, et al., "Optimizing Acoustic Feature Extractor for Anomalous Sound Detection Based on Neyman-Pearson Lemma," EUSIPCO, 2017.

When overlooking of an anomalous state is continued in the anomalous sound detection system, it may lead to a serious accident. Since it is difficult to obtain all anomalous data that a monitoring target apparatus may make, it is difficult to prevent all anomalous states that the monitoring target apparatus can take from being overlooked. However, it is possible to construct a system so that at least an anomalous state similar to obtained anomalous data is necessarily judged to be anomalous. Therefore, the definition of the true positive rate (TPR) of Formula (36) is changed like Formula (38).

$$\text{TPR}(\Theta, g_n, \phi) = \int H(A(x) - \phi) p(x|Y) dx \quad (38)$$

Formula (39) that minimizes the false positive rate (FPR) under a condition that this true positive rate (TPR) is 1.0 is made an objective function of the present embodiment. Hereinafter, the objective function of Formula (39) will be called "conditional AUC maximization".

$$C(\Theta_n, g_n) = \underset{\Theta_n, g_n}{\arg\min} \text{FPR}(\Theta, g_n, \phi), \text{ subject to } \text{TPR}(\Theta, g_n, \phi) = 1 \quad (39)$$

Figure 9A:
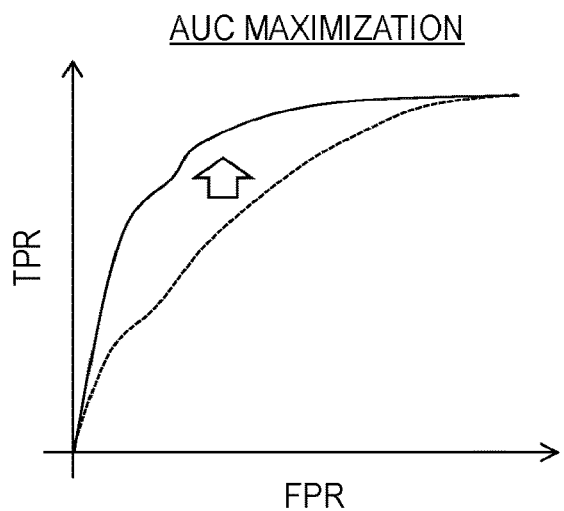
FIG. 9A is a diagram for describing a concept of AUC maximization.
Figure 9B:
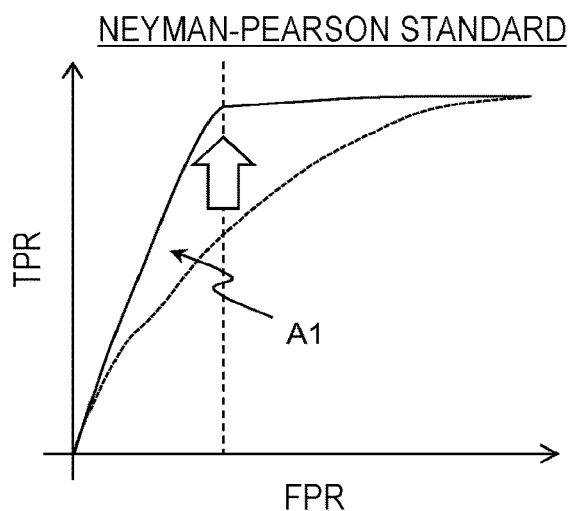
FIG. 9B is a diagram for describing a concept of the Neyman-Pearson Standard.
Figure 9C:
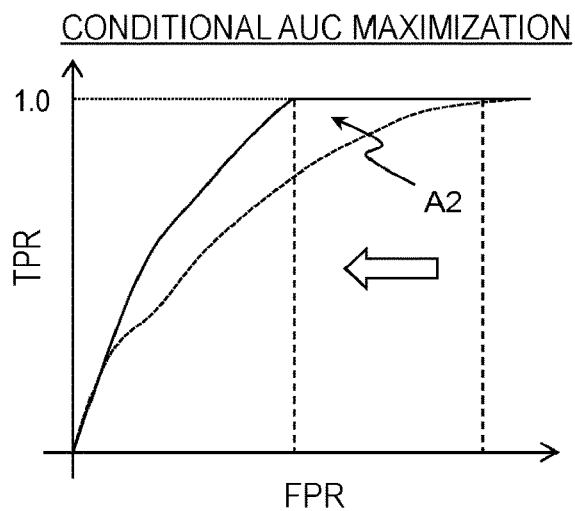
FIG. 9C is a diagram for describing a concept of conditional AUC maximization.

FIG. 9 shows diagrams showing concept differences between conventional "AUC maximization" (FIG. 9A) and "the Neyman-Pearson Standard" (FIG. 9B), and "the conditional AUC maximization" of the present embodiment (FIG. 9C). A dotted line in each figure is a receiver operating characteristic (ROC) curve before learning, and a solid line is an ROC curve after learning. Further, AUC indicates the area of an area sandwiched between the ROC curve and the x axis. In AUC maximization, learning is performed so that this area is increased. In the Neyman-Pearson Standard, AUC is maximized (an area A1 on the left of a dashed line) by improving TPR of an area where the false positive rate (FPR) is a particular value. In comparison, the conditional AUC maximization is equal to directly maximizing AUC in an area where the true positive rate (TPR) is 1.0 (an area A2 on the right of the dashed line). That is, the restriction term is not the false positive rate (FPR) but has changed to the true positive rate (TPR). That is, in the conditional AUC maximization, the objective function is such that minimizes the probability of misjudging normal data as anomalous, under a condition that anomalous data can be certainly judged as anomalous.

<<Learning Method>>

An algorithm that realizes an objective function on a calculator will be considered. The restriction term in Formula (39) can be satisfied by setting an appropriate threshold. Here, if $\phi_\rho$ satisfies Formula (40) below:

$$\text{TPR}(\Theta, g_N, \phi_\rho) = 1 \quad (40)$$

then, Formula (39) can be written such as Formula (41).

$$C(\Theta, g_n) = \underset{\Theta, g_n}{\arg\min} \text{FPR}(\Theta, g_n, \phi_\rho) \quad (41)$$

Therefore, by determining the threshold $\phi_\rho$ as described above, optimization becomes easy.

It is that the above integration cannot be analytically executed that is difficult in determining the true positive rate (TPR) in Formula (38). Therefore, in the present invention, the above integration is approximately executed by a sampling method. First, I pieces of anomalous samples $Y := \{y_i\}_{i=1}^I$ are pseudo-generated from estimated anomalous distribution $p(x|Y)$.

$$y_i \sim p(x, Y) \quad (42)$$

Here, ~ indicates an operator that generates pseudorandom numbers from probability distribution on the right side using a pseudorandom number generation method or the like. Even if $p(x|Y)$ is not normalized probability distribution, samples are generated with a probability proportional to the values using a slice sampling method or the like. A condition for satisfying Formula (40) using the samples is that $\phi_\rho$ is smaller than all anomaly scores determined from the generated samples. Therefore, $\phi_\rho$ is decided as below.

$$\phi_\rho \leftarrow \min_i A(y_i) - \beta \quad (43)$$

Here, $\beta$ indicates a positive constant.

Finally, though it is desired to maximize Formula (39), integration in the false positive rate (FPR) in Formula (37) cannot be analytically calculated, either. Therefore, J pieces of data are randomly selected from normal data, and optimization is performed by a stochastic gradient method in which a gradient is calculated by approximating integration to a sum of values calculated from the data.

$$C(\Theta_n, g_n) = \arg\min_{\Theta, g_n} \sum_{j=1}^{J} H(A(x_j) - \phi_\rho) \quad (44)$$

$$\Theta_n \leftarrow \Theta_n - \alpha \frac{\partial C(\Theta_n, g_n)}{\partial \Theta_n} \quad (45)$$

$$g_n \leftarrow \Theta_n - \alpha \frac{\partial C(\Theta_n, g_n)}{\partial g_n} \quad (46)$$

Here, $\alpha$ indicates a step size. As for $H(\cdot)$, which is a step function, since the gradient cannot be determined, $H(\cdot)$ is approximated with a sigmoid function. The objective function may be changed like Formula (47).

$$C(\Theta_n, g_n) = \arg\min_{\Theta, g_n} \sum_{j=1}^{J} H(A(x_j) - \phi_\rho) - \sum_{i=1}^{I} H(A(y_i) - \phi_\rho) \quad (47)$$

That is, in the present embodiment, an anomaly model is learned on the assumption that an objective function is such that minimizes the probability of misjudging normal data as anomalous regarding it as a restriction condition to be capable of certainly judging obtained anomalous data itself or anomalous data pseudo-generated using an anomaly model determined from the obtained anomalous data as anomalous.

<Example of Implementation Using Gaussian Kernel>

An example of implementing the principle of the anomalous sound detection of the present embodiment described above using a Gaussian kernel will be described. An anomaly model in the present embodiment will be defined like Formula (48).

$$p(x|Y) = \sum_{n=1}^{N} g_n \exp\left\{-\sum_{d=1}^{D} \lambda_{n,d}(x_d - y_{n,d})^2 + \sum_{d=1}^{D} \ln(\lambda_{n,d} + \varepsilon)\right\} \quad (48)$$

Here, $0 \leq \lambda_{n,d}$, $0 \leq g_n$ and $\Sigma_{n=1}^{N} g_n = 1$ are satisfied, and $\varepsilon$ indicates a small positive constant; and $g_n$ indicates a parameter indicating how important the n-th piece of anomalous data is for anomaly judgment relatively compared with other pieces of anomalous data. Further, $\lambda_{n,d}$ indicates a parameter how important the d-th dimension of the n-th piece of anomalous data is for anomaly judgment. If the anomaly model $p(x|Y)$ is grasped as a probability density function, it must be standardized as $\int K(x, y)dx = 1$, and $\Sigma_{n=1}^{N} g_n = 1$ must be satisfied. If the anomaly model is grasped as a penalty term to observed data similar to obtained anomalous data, it is not necessary to satisfy the restriction of standardization, which is a condition for probability distribution. Therefore, $\int K(x, y)dx = 1$ is not satisfied in Formula (48).

When the anomaly model of Formula (48) is used, each parameter can be updated as below. First, anomalous samples are generated to determine the threshold $\phi_\rho$. The anomaly model is defined based on Formula (48), the anomalous samples are generated, for example, like Formulas (49) and (50).

$$z_i \sim \text{Categorical}(g_1, \ldots, g_N) \quad (49)$$

$$y_{i,d} \sim N(y_{i,d}|y_{z_i,d}, (\lambda_{z_i,d} + \varepsilon)^{-1}) \quad (50)$$

Here, Categorical indicates category distribution.

Next, a threshold is set by Formula (43). Then, the parameters can be updated like Formulas (51) and (52), respectively.

$$\lambda_{n,d} \leftarrow \lambda_{n,d} - \alpha \left\{ \frac{1}{J} \sum_{j=1}^{J} \frac{\partial H(A(x_j) - \phi_\rho)}{\partial A(x_j)} \frac{\partial A(x_j)}{\partial \lambda_{n,d}} \right\} \quad (51)$$

$$g_n \leftarrow g_n - \alpha \left\{ \frac{1}{J} \sum_{j=1}^{J} \frac{\partial H(A(x_j) - \phi_\rho)}{\partial A(x_j)} \frac{\partial A(x_j)}{\partial g_n} \right\} \quad (52)$$

Here, Formulas (53), (54) and (55) below are satisfied:

$$\frac{\partial H(A(x) - \phi_\rho)}{\partial A(x)} = H(A(x) - \phi_\rho)(1 - H(A(x) - \phi_\rho)) \quad (53)$$

$$\frac{\partial A(x)}{\partial \lambda_{n,d}} = \gamma_n \left(-(x_d - y_{n,d})^2 + \frac{1}{\lambda_{n,d} + \varepsilon}\right) \quad (54)$$

$$\frac{\partial A(x)}{\partial g_n} = \gamma_n \frac{1}{g_n} \quad (55)$$

A coefficient $\gamma_n$ is determined as below:

$$\gamma_n = \frac{g_n \exp\left\{-\sum_{d=1}^{D} \lambda_{n,d}(x_d - y_{n,d})^2 + \sum_{d=1}^{D} \ln(\lambda_{n,d} + \varepsilon)\right\}}{\sum_{n=1}^{N} g_n \exp\left\{-\sum_{d=1}^{D} \lambda_{n,d}(x_d - y_{n,d})^2 + \sum_{d=1}^{D} \ln(\lambda_{n,d} + \varepsilon)\right\}} \quad (56)$$

Further, the following post-processing is performed for each update to satisfy $0 \leq \lambda_{n,d}$, $0 \leq g_n$ and $\Sigma_{n=1}^{N} g_n = 1$.

$$g_n \leftarrow \frac{g_n}{\sum_{n=1}^{N} g_n} \quad (57)$$

$$\lambda_{n,d} \leftarrow \max(0, \lambda_{n,d}) \quad (58)$$

For regularization, the post-processing of $\lambda_{n,d}$ may be performed as follows:

$$\lambda_{n,d} \leftarrow \max(0, \lambda_{n,d} - \xi) \quad (59)$$

Here, approximately $\xi = 10^{-7}$ can be set.

Figure 10A:
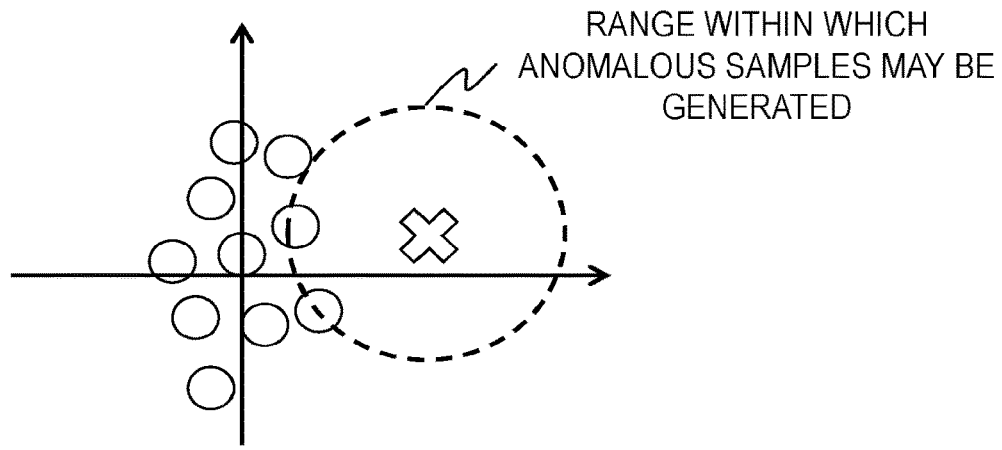
FIG. 10A is a diagram illustrating distribution when anomalous samples are generated without optimizing variance.
Figure 10B:
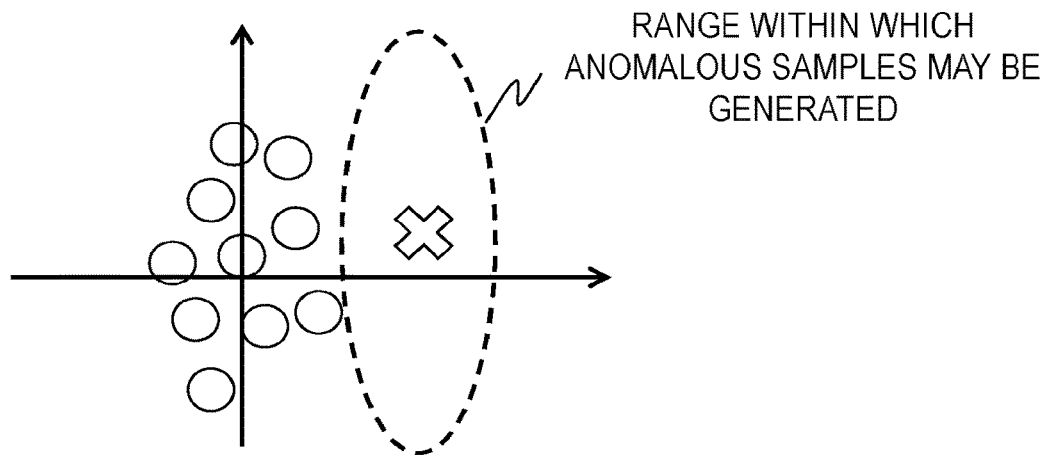
FIG. 10B is a diagram illustrating distribution when anomalous samples are generated by optimizing variance.

It is also conceivable to fix the parameter $\lambda_{n,d}$ for the shape of a Gaussian kernel and learn only an importance parameter $g_n$. However, when sampling is performed in such a situation, there is a possibility that anomalous data is generated within a normal range as illustrated in FIG. 10A. Thereby, approximation of an expected value in calculation of TPR becomes unstable, and there is a possibility that a threshold cannot be correctly set. Therefore, if $\lambda_{n,d}$ is fixed, setting of a threshold using sampling cannot be performed, and it is necessary to directly set a threshold from obtained anomalous samples. Since a reciprocal of $\lambda_{n,d}$ indicates variance, the optimization of $\lambda_{n,d}$ makes an anomalous sample not be generated within the range of normal data in the feature dimension that is important for detection, as illustrated in FIG. 10B. Therefore, in the present embodiment, setting of a threshold using sampling is enabled by learning $\lambda_{n,d}$.

A second embodiment of the present invention will be described below in detail. The second embodiment of the present invention is configured with an anomaly model learning apparatus 3 that performs the anomaly model learning described above and an anomalous sound detection apparatus 4 that judges whether an observed signal is normal or anomalous using the anomaly model learned by the anomaly model learning apparatus 3.

<<Anomaly Model Learning Apparatus>>

Figure 11:
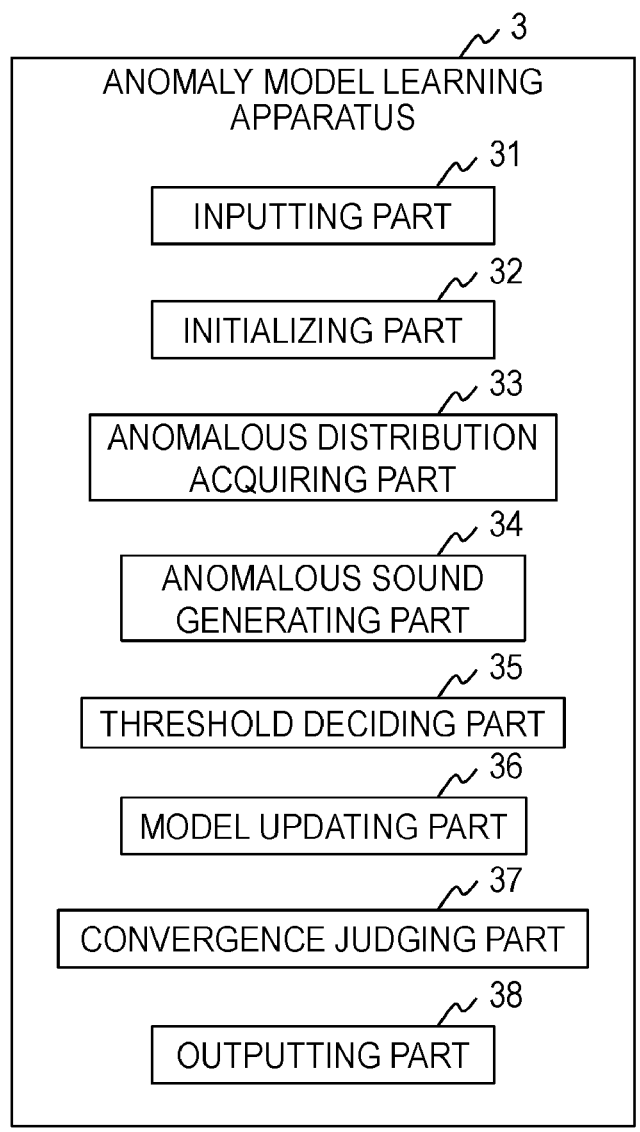
FIG. 11 is a diagram illustrating a functional configuration of an anomaly model learning apparatus.

The anomaly model learning apparatus 3 of the second embodiment is provided with an inputting part 31, an initializing part 32, an anomalous distribution acquiring part 33, an anomalous sound generating part 34, a threshold deciding part 35, a model updating part 36, a convergence judging part 37 and an outputting part 38 as illustrated in FIG. 11. By this anomaly model learning apparatus 3 performing processing of each step illustrated in FIG. 12, an anomaly model learning method of the second embodiment is realized.

The anomaly model learning apparatus 3 is, for example, a special apparatus configured by a special program being read into a publicly known or dedicated computer having a central processing unit (CPU), a main memory (RAM: random access memory) and the like. For example, the anomaly model learning apparatus 3 executes each processing under control of the central processing unit. Data inputted to the anomaly model learning apparatus 3 and data obtained by each processing are stored, for example, into the main memory, and the data stored in the main memory is read out to the central processing unit and used for other processing as necessary. At least a part of each processing part of the anomaly model learning apparatus 3 may be configured with hardware such as an integrated circuit.

Figure 12:
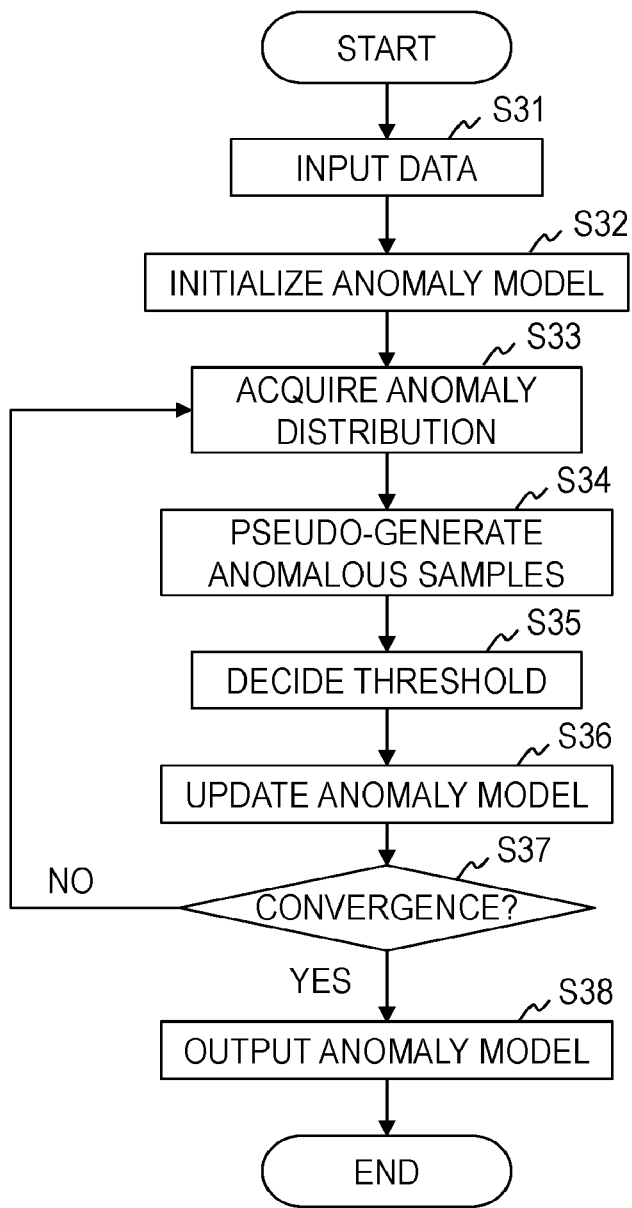
FIG. 12 is a diagram illustrating a process procedure for an anomaly model learning method.

The anomaly model learning method executed by the anomaly model learning apparatus 3 of the second embodiment will be described below with reference to FIG. 12.

At step S31, the inputting part 31 receives a normal model p(x|z=0), normal sound data, anomalous sound data and parameters $\alpha$, $\beta$, $\varepsilon$ and $\xi$ required for learning as an input. The parameters $\alpha$, $\beta$, $\varepsilon$ and $\xi$ are set according to an environment and set, for example, to approximately $\alpha=10^{-4}$, $\beta=5$, $\varepsilon=10^{-6}$ and $\xi=10^{-7}$. The normal model p(x|z=0) is probability distribution estimated using normal sound data and is similar to a normal model used in the conventional unsupervised anomalous sound detection. The normal sound data is a large amount of sound data obtained by recording sounds made by an apparatus in a normal state. The anomalous sound data is a small amount of sound data obtained by recording sounds made by the apparatus in an anomalous state. Though it is preferable that the inputted normal sound data is the same as the normal sound data used to learn the normal model p(x|z=0), it is not necessarily required to be the same.

At step S32, the initializing part 32 initializes $\lambda_{n,d}$ and $g_n$ with uniform random numbers or the like so that $0 \leq \lambda_{n,d}$, $0 \leq g_n$ and $\Sigma_{n=1}^{N} g_n = 1$ are satisfied. The initializing part 32 outputs the initialized parameters $\lambda_{n,d}$ and $g_n$ to the anomalous distribution acquiring part 33.

At step S33, the anomalous distribution acquiring part 33 receives the parameters $\lambda_{n,d}$ and $g_n$ and generates the anomaly model p(x|Y) of Formula (48) from the inputted anomalous sound data. When executing step S33 the second time and subsequently, the anomalous distribution acquiring part 33 generates the anomaly model p(x|Y) of Formula (48) from the parameters $\lambda_{n,d}$ and $g_n$ being learned and anomalous samples $\{y_n\}_{n=1}^{N}$ pseudo-generated at step S34. The anomalous distribution acquiring part 33 outputs the generated anomaly model p(X|Y) to the anomalous sound generating part 34.

At step S34, the anomalous sound generating part 34 receives the anomaly model p(x|Y) from the anomalous distribution acquiring part 33 and pseudo-generates N anomalous samples $\{y_n\}_{n=1}^{N}$ by Formulas (49) and (50). The anomalous sound generating part 34 outputs the pseudo-generated anomalous samples $\{y_n\}_{n=1}^{N}$ to the threshold deciding part 35.

At step S35, the threshold deciding part 35 receives the anomalous samples $\{y_n\}_{n=1}^{N}$ from the anomalous sound generating part 34 and sets a threshold $\phi_\rho$ based on Formula (43). The threshold deciding part 35 outputs the decided threshold $\phi_\rho$ to the model updating part 36.

At step S36, the model updating part 36 receives the threshold $\phi_\rho$ from the threshold deciding part 35 and updates the parameters $\lambda_{n,d}$ and $g_n$ of the anomaly model p(X|Y) based on Formulas (51) to (58). At this time, for Formulas (51) and (52), not only a simple gradient descent method but also a different gradient method, for example, the Adam method may be used.

At step S37, the convergence judging part 37 judges whether an predetermined end condition is satisfied or not. The convergence judging part 37 advances the process to step S38 if the end condition is satisfied, and returns the process to step S33 if the end condition is not satisfied. As the end condition, for example, it can be set that repetition of steps S33 to S36 has been executed five hundred times.

At step S38, the outputting part 38 outputs the learned parameters $\lambda_{n,d}$ and $g_n$.

<<Anomalous Sound Detection Apparatus>>

Figure 13:
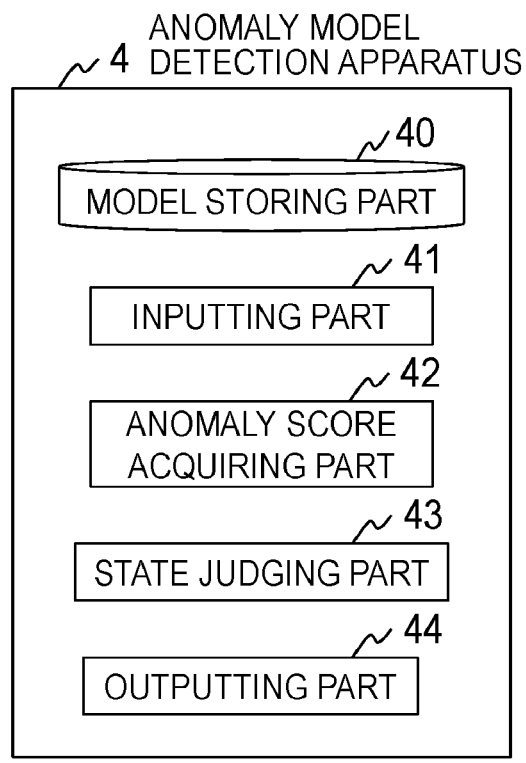
FIG. 13 is a diagram illustrating a functional configuration of an anomalous sound detection apparatus.

The anomalous sound detection apparatus 4 of the second embodiment is provided with a model storing part 40, an inputting part 41, an anomaly score acquiring part 42, a state judging part 43 and an outputting part 44 as illustrated in FIG. 13. By this anomalous sound detection apparatus 4 performing processing of each step illustrated in FIG. 14, an anomalous sound detection method of the second embodiment is realized.

The anomalous sound detection apparatus 4 is, for example, a special apparatus configured by a special program being read into a publicly known or dedicated computer having a central processing unit (CPU), a main memory (RAM: random access memory) and the like. For example, the anomalous sound detection apparatus 4 executes each processing under control of the central processing unit. Data inputted to the anomalous sound detection apparatus 4 and data obtained by each processing are stored, for example, into the main memory, and the data stored in the main memory is read out to the central processing unit and used for other processing as necessary. At least a part of each processing part of the anomalous sound detection apparatus 4 may be configured with hardware such as an integrated circuit. Each storing part the anomalous sound detection apparatus 4 is provided with can be configured, for example, with a main memory such as a RAM (random access memory), an auxiliary storage device configured with a hard disk, an optical disc, or a semiconductor memory device like a flash memory, or middleware such as a relational database or a key-value store.

In the model storing part 40, the normal model p(x|z=0), the anomaly model p(x|z=1) and the threshold $\phi$ are stored. The normal model p(x|z=0) is a model obtained by estimating probability distribution using normal sound data similarly to the anomaly model learning apparatus 3, and is similar to a normal model used in the conventional unsupervised anomalous sound detection. The anomaly model p(x|z=1) is a model obtained by learning the parameters $\lambda_{n,d}$ and $g_n$ (d=1, ..., D; n=1, ..., N) using the anomalous sound data $\{y_n\}_{n=1}^N$ by the anomaly model learning apparatus 3. The threshold $\phi$ may be the threshold $\phi_\rho$ decided by the threshold deciding part 35 of the anomaly model learning apparatus 3 or may be a threshold manually given beforehand.

Figure 14:
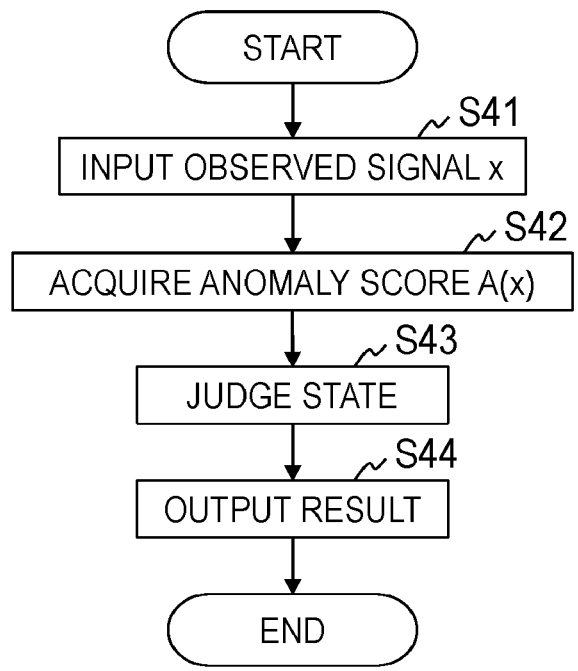
FIG. 14 is a diagram illustrating a process procedure for an anomalous sound detection method.

The anomalous sound detection method executed by the anomalous sound detection apparatus 4 of the second embodiment will be described below with reference to FIG. 14.

At step S41, the inputting part 41 receives an observed signal x targeted by anomalous sound detection as an input. The inputting part 41 outputs the observed signal x to the anomaly score acquiring part 42.

At step S42, the anomaly score acquiring part 42 receives the observed signal x from the inputting part 41, and calculates Formula (35) and obtains an anomaly score A(x). The anomaly score acquiring part 42 outputs the obtained anomaly score A(x) to the state judging part 43.

At step S43, the state judging part 43 receives the anomaly score A(x) from the anomaly score acquiring part 42, and calculates Formula (31) to judge whether the observed signal x is normal or anomalous. The state judging part 43 outputs a judgment result, which is binary data showing whether the observed signal x is normal or anomalous, to the outputting part 44.

At step S44, the outputting part 44 receives the judgment result from the state judging part 43 and sets the judgment result as an output of the anomalous sound detection apparatus 4.

Modification of Second Embodiment

Though a configuration is adopted in which the anomaly model learning apparatus 3 pseudo-generates anomalous samples and learns parameters of an anomaly model in the present embodiment, it is also possible to configure an anomalous sound generation apparatus provided with only the function of pseudo-generating anomalous samples. This anomalous sound generation apparatus is provided with the anomalous distribution acquiring part 33 and the anomalous sound generating part 34 that the anomaly model learning apparatus 3 of the second embodiment is provided with. In this anomalous sound generation apparatus, for example, with normal data, a small amount of anomalous data, a normal model and parameters required for learning as an input, the anomalous distribution acquiring part 33 obtains anomaly distribution, which is probability distribution followed by anomalous sounds, from the anomalous data; and the anomalous sound generating part 34 pseudo-generates anomalous samples using the anomaly distribution and sets the anomalous samples as an output of the anomalous sound generation apparatus.

Though an example in which the anomaly model learning apparatus 3 and the anomalous sound detection apparatus 4 are configured as separate apparatuses has been described in the present embodiment, it is also possible to configure one anomalous sound detection apparatus provided with both of the function of learning an anomaly model and the function of performing anomalous sound detection using the learned anomaly model. That is, the anomalous sound detection apparatus of the modification includes the inputting part 31, the initializing part 32, the anomalous distribution acquiring part 33, the anomalous sound generating part 34, the threshold deciding part 35, the model updating part 36, the convergence judging part 37, the model storing part 40, the inputting part 41, the anomaly score acquiring part 42, the state judging part 43 and the outputting part 44.

Though anomalous sound detection targeting sound data has been described in the present embodiment, the present embodiment can be applied to data other than sound data. For example, the present embodiment can be applied to time-series data other than sound data, or image data. In order to apply the present embodiment to such data, it is only required to cause x to be suitable for the application target. In the case of vibration sensor or stock price data, what is obtained by collecting time-series information about the data or a result of performing Fourier transform thereof may be used as x. In the case of an image, features of the image or a result of analyzing the features by a neural network or the like may be used as x. In this case, the anomalous sound detection apparatus 2 functions as an anomaly detection apparatus that judges whether observed data is normal or anomalous, using a normal model obtained by learning normal data, which is data during a normal time, and an anomaly model obtained by learning anomalous data, which is data during an anomalous time.

The embodiments of the present invention have been described above. Specific configurations are not limited to the embodiments, and it goes without saying that, even if design changes and the like are appropriately made within a range not departing from the spirit of the present invention, the design changes and the like are included in the present invention. Various kinds of processing described in the embodiments are not only executed in time series in order of the description but also may be executed in parallel or individually according to processing capability of an apparatus that executes the processing or as necessary.

[Program and Recording Medium]

In the case of realizing the various kinds of processing functions in each apparatus described in the above embodiments by a computer, processing content of functions that the apparatus should have is written by a program. Then, by executing this program on the computer, the various kinds of processing functions of each apparatus described above are realized on the computer.

The program in which the processing content is written can be recorded in a computer-readable recording medium. As the computer-readable recording medium, anything is possible, for example, a magnetic recording device, an optical disk, a magneto-optical recording medium or a semiconductor memory.

Distribution of this program is performed, for example, by performing sales, transfer, lending or the like of a portable recording medium such as a DVD or a CD-ROM in which the program is recorded. Furthermore, a configuration is also possible in which this program is stored in a storage device of a server computer, and is distributed by being transferred from the server computer to other computers via a network.

For example, a computer that executes such a program first stores the program recorded in a portable recording medium or transferred from a server computer into its own storage device once. Then, at the time of executing processing, the computer reads the program stored in its own storage device and executes the processing according to the read program. Further, as another execution form of this program, a computer may directly read the program from a portable recording medium and execute processing according to the program. Furthermore, each time a program is transferred to the computer from a sever computer, the computer may sequentially execute processing according to the received program. Further, a configuration is also possible in which the above processing is executed by a so-called ASP (application service provider) type service in which, without transferring the program to the computer from the server computer, the processing functions are realized only by an instruction to execute the program and acquisition of a result. It is assumed that the program in this form includes information which is provided for processing by an electronic calculator and is equivalent to a program (data or the like which is not a direct command to the computer but has a nature of specifying processing of the computer).

Further, though it is assumed in this form that the apparatus is configured by causing a predetermined program to be executed on a computer, at least a part of the processing content may be realized as hardware.

What is claimed is:

1. An anomalous sound detection apparatus comprising:
   a microphone configured to record sound data in an area of a monitoring target apparatus to obtain inputted target data, the sound data including an operation sound of the monitoring target apparatus; and
   processing circuitry configured to
   store a normal model learned with pieces of normal sound data representing normal operation of the monitoring target apparatus and an anomaly model learned with pieces of anomalous sound data representing anomalous operation of the monitoring target apparatus;
   calculate an anomaly score for the inputted target data using the normal model and the anomaly model; and
   compare the anomaly score with a predetermined threshold to judge whether the target data is normal or anomalous; wherein
   the anomaly model is obtained by the processing circuitry determining a minimum value among anomaly scores calculated for the plurality of pieces of anomalous sound data using at least the normal model as a threshold for learning and determining weights of the anomaly model using a plurality of pieces of normal sound data, the pieces of anomalous sound data and the threshold, wherein each of the pieces of anomalous sound data has an inversely proportional relationship to a respective corresponding weight to multiply data.

2. The anomalous sound detection apparatus according to claim 1, wherein, N indicates an integer equal to or larger than 1, $x_1, \ldots, x_N$ indicates the pieces of anomalous sound data, $w_1, \ldots, w_N$ indicates weights of the anomaly model, $\alpha$ indicates a positive constant, C indicates a positive constant, $p(x|z=0)$ indicates the normal model and $p_n(x|x_n)$ indicates probability distribution estimated from an n-th piece of anomalous sound data $x_n$, the anomaly model is obtained by calculating an anomaly score A(x) for target data x by the following formula:

$$A(x) = -\ln p(x \mid z = 0) + \ln\left[\frac{\alpha}{N+\alpha}C + \sum_{n=1}^{N} \frac{w_n}{N+\alpha} p_n(x \mid x_n)\right].$$

3. The anomalous sound detection apparatus according to claim 1, wherein, N indicates an integer equal to or larger than 1, $x_1, \ldots, x_N$ indicates the pieces of anomalous sound data, K indicates an integer equal to or larger than 1, $x_1, \ldots, x_K$ indicates the pieces of normal data, $\alpha$ indicates a positive constant, C indicates a positive constant, A(x) indicates an anomaly score of x, $\phi_w$ indicates the threshold, $p(x|z=0)$ indicates the normal model, $p_n(x|x_n)$ indicates probability distribution estimated from an n-th piece of anomalous sound data $x_n$, $\lambda$ indicates a predetermined step size and $^T$ indicates a transpose, the anomaly model is obtained by determining weights $w=(w_1, \ldots, w_N)^T$ for the anomaly model by calculating the following formula:

$$w \leftarrow w - \lambda \nabla_w J(w),$$

wherein $$\nabla_w J(w) = (\nabla_{w_1} J(w), \nabla_{w_2} J(w), \ldots, \nabla_{w_N} J(w))^T,$$

$$\nabla_{w_n} J(w) = \frac{1}{K}\sum_{k=1}^{K} \nabla_{w_n} S_k \nabla_{w_n} A(x_k),$$

$$\nabla_{w_n} S_k = \text{sigmoid}\{A(x_k) - \phi_w\}(1 - \text{sigmoid}\{A(x_k) - \phi_w\}),$$

$$\nabla_{w_n} A(x_k) = \frac{\frac{1}{N+\alpha} p_n(x_k \mid x_n)}{\frac{\alpha}{N+\alpha}C + \sum_{n=1}^{N} \frac{w_n}{N+\alpha} p_n(x_k \mid x_n)}.$$

4. An anomalous sound detection method, implemented by processing circuitry of an anomalous sound detection apparatus, comprising:
   recording, with a microphone, sound data in an area of a monitoring target apparatus to obtain inputted target data, the sound data including an operation sound of the monitoring target apparatus;
   storing a normal model learned with pieces of normal sound data representing normal operation of the monitoring target apparatus and an anomaly model learned with pieces of anomalous sound data representing anomalous operation of the monitoring target apparatus;
   calculating an anomaly score for the inputted target data using the normal model and the anomaly model; and
   comparing the anomaly score with a predetermined threshold to judge whether the target data is normal or anomalous; wherein
   the anomaly model is obtained by the processing circuitry determining a minimum value among anomaly scores calculated for the plurality of pieces of anomalous sound data using at least the normal model as a threshold for learning and determining weights of the anomaly model using a plurality of pieces of normal sound data, the pieces of anomalous sound data and the threshold, wherein each of the pieces of anomalous sound data has an inversely proportional relationship to a respective corresponding weight to multiply data.

5. A non-transitory computer-readable storage medium storing a program for causing a computer to function as the anomalous sound detection apparatus according to claim 1.

* * * * *